(12) United States Patent
Zivkovic et al.

(10) Patent No.: US 12,314,216 B2
(45) Date of Patent: May 27, 2025

(54) DIGITAL PRE-DISTORTION (DPD) ADAPTATION USING A HYBRID HARDWARE ACCELERATOR AND PROGRAMMABLE ARRAY ARCHITECTURE

(71) Applicant: Intel Corporation, Santa Clara, CA (US)

(72) Inventors: Zoran Zivkovic, Hertogenbosch (NL); Kameran Azadet, San Ramon, CA (US); Kannan Rajamani, Basking Ridge, NJ (US); Thomas Smith, Colmar, PA (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 17/560,685

(22) Filed: Dec. 23, 2021

(65) Prior Publication Data

US 2023/0205727 A1   Jun. 29, 2023

(51) Int. Cl.
*G06F 9/38*       (2018.01)
*G06F 1/26*       (2006.01)
*G06F 15/80*      (2006.01)

(52) U.S. Cl.
CPC ............... *G06F 15/80* (2013.01); *G06F 1/26* (2013.01)

(58) Field of Classification Search
CPC .............................. G06F 15/80; G06F 9/3877
See application file for complete search history.

(56) References Cited

U.S. PATENT DOCUMENTS

| | | | | |
|---|---|---|---|---|
| 9,008,156 | B1* | 4/2015 | Dick | H04W 84/047 375/220 |
| 9,130,628 | B1* | 9/2015 | Mittal | H03F 3/24 |
| 9,843,346 | B1* | 12/2017 | Mundarath | H03F 3/195 |
| 2015/0172081 | A1* | 6/2015 | Wloczysiak | H03F 1/3258 375/296 |

(Continued)

OTHER PUBLICATIONS

Pere L. Gilabert, Albert Cesari, Gabriel Montoro, Eduard Bertran, and Jean-Marie Dilhac. "Multi-Lookup Table FPGA Implementation of an Adaptive Digital Predistorter for Linearizing RF Power Amplifiers With Memory Effects" IEEE Feb. 2008 (Year: 2008).*

(Continued)

*Primary Examiner* — Jacob Petranek
(74) *Attorney, Agent, or Firm* — Banner Witcoff Ltd.

(57) ABSTRACT

Techniques are disclosed for the use of a hybrid architecture that combines a programmable processing array and a hardware accelerator. The hybrid architecture dedicates the most computationally intensive blocks to the hardware accelerator, which may be implemented for the computation of pre-distortion (DPD) coefficients while maintaining flexibility for additional DPD computations to be performed by the programmable processing array. An interface is also described for coupling the processing array to the hardware accelerator, which achieves a division of functionality and connects the programmable processing array components to the hardware accelerator components without sacrificing flexibility. This results in a balance between power/area and flexibility.

24 Claims, 14 Drawing Sheets

(56) References Cited

U.S. PATENT DOCUMENTS

2016/0191146 A1* 6/2016 Abouelenin .......... H03F 1/0222
  455/12.1
2017/0244582 A1* 8/2017 Gal ................... H04L 25/03885

OTHER PUBLICATIONS

Özgül, B., et al., "Software-Programmable Digital Pre-distortion on New Generation FPGAs", Analog Integrated Circuits and Signal Processing, Springer New York LLC, vol. 78, No. 3, 15 pgs., Oct. 13, 2013.
Huang, H., et al., "Novel Parallel-Processing-Based Hardware Implementation of Baseband Digital Predistorters for Linearizing Wideband 5G Transmitters", IEEE Transactions on Microwave Theory and Techniques, IEEE, vol. 68, No. 9, 11 pgs., May 25, 2020.
Kumar, N., et al., "Software-Defined Radio Transceiver Design Using FGGA-Based System-on-Chip Embedded Platform with Adaptive Digital Predistortion", IEEE Access, IEEE, vol. 8, 12 pgs., Dec. 1, 2020.
May 17, 2023 (EP) Search Report—App. 22214643.3.

* cited by examiner

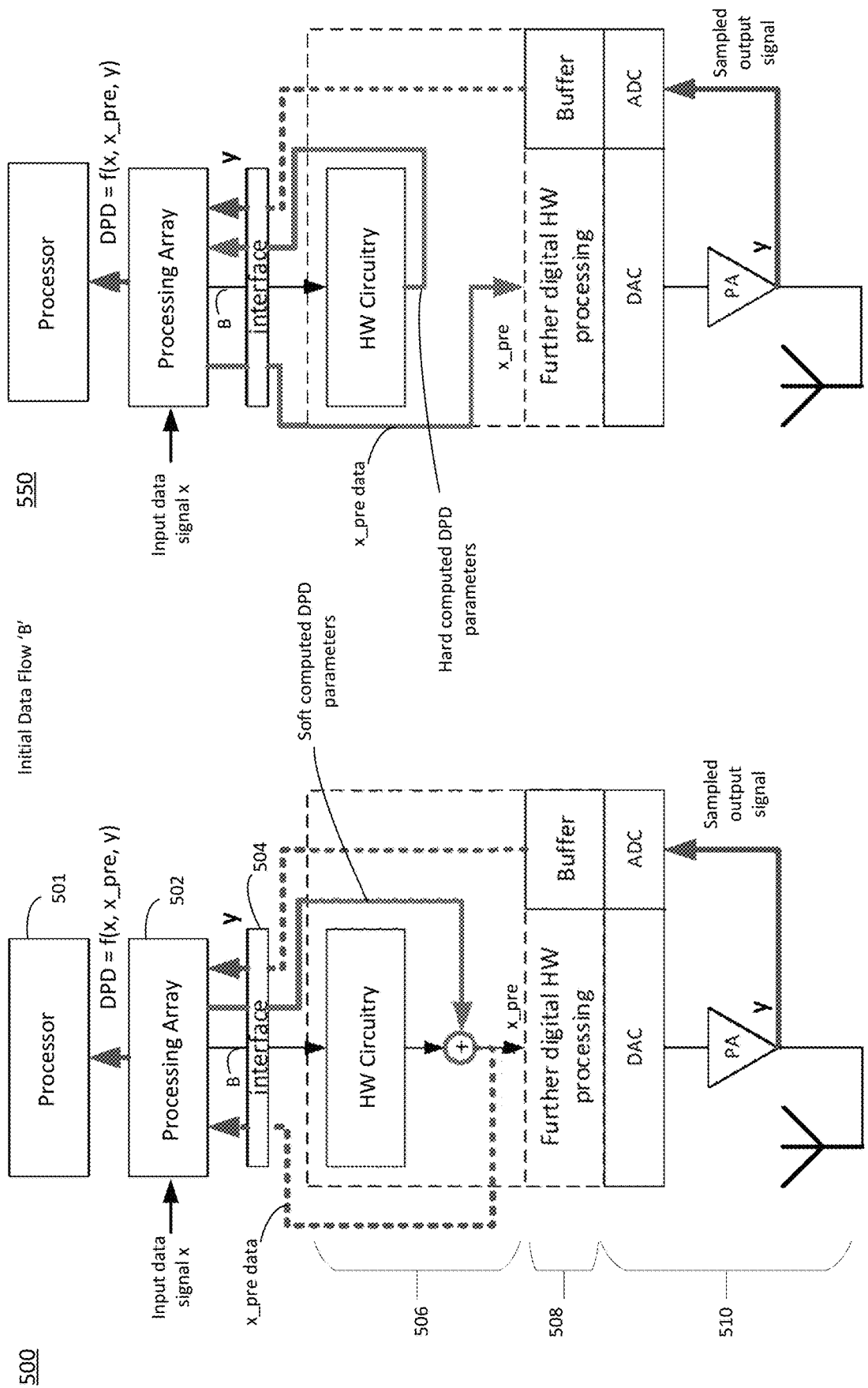

DIGITAL PRE-DISTORTION (DPD) ADAPTATION USING A HYBRID HARDWARE ACCELERATOR AND PROGRAMMABLE ARRAY ARCHITECTURE

TECHNICAL FIELD

The disclosure described herein generally relates to techniques for interfacing a processing array architecture with a hardware accelerator architecture to provide a hybrid solution that realizes the benefits of both architectures.

BACKGROUND

In many applications such as digital front end (DFE) radios, there is a need for fast computations to ensure that the digital data is transmitted and received efficiently. This may include the calculation of digital pre-distortion (DPD) coefficients or other terms used for digital communications, which require fast and accurate processing as data is transmitted and/or received as part of a data stream.

Programmable solutions for DFE radios provide flexibility to adapt the manner in which such computations are performed, but are inefficient in terms of cost and power. For instance, hardwired application specific integrated circuit (ASIC) solutions may be implemented in current DFE radio products, as ASICs are power and cost efficient, but lack the flexibility provided by programmable processing arrays. Programmable processing arrays, on the other hand, although flexible in their implementation, are computationally intensive and thus inefficient in terms of power, and are less cost-effective. Therefore, both hardwired and programmable solutions have various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 5A illustrates a block diagram of a first hybrid programmable processing array and hardware accelerator architecture, in accordance with the disclosure.

FIG. 5B illustrates a block diagram of a second hybrid programmable processing array and hardware accelerator architecture, in accordance with the disclosure.

The present disclosure will be described with reference to the accompanying drawings. The drawing in which an element first appears is typically indicated by the leftmost digit(s) in the corresponding reference number.

DETAILED DESCRIPTION

Figure 1A:
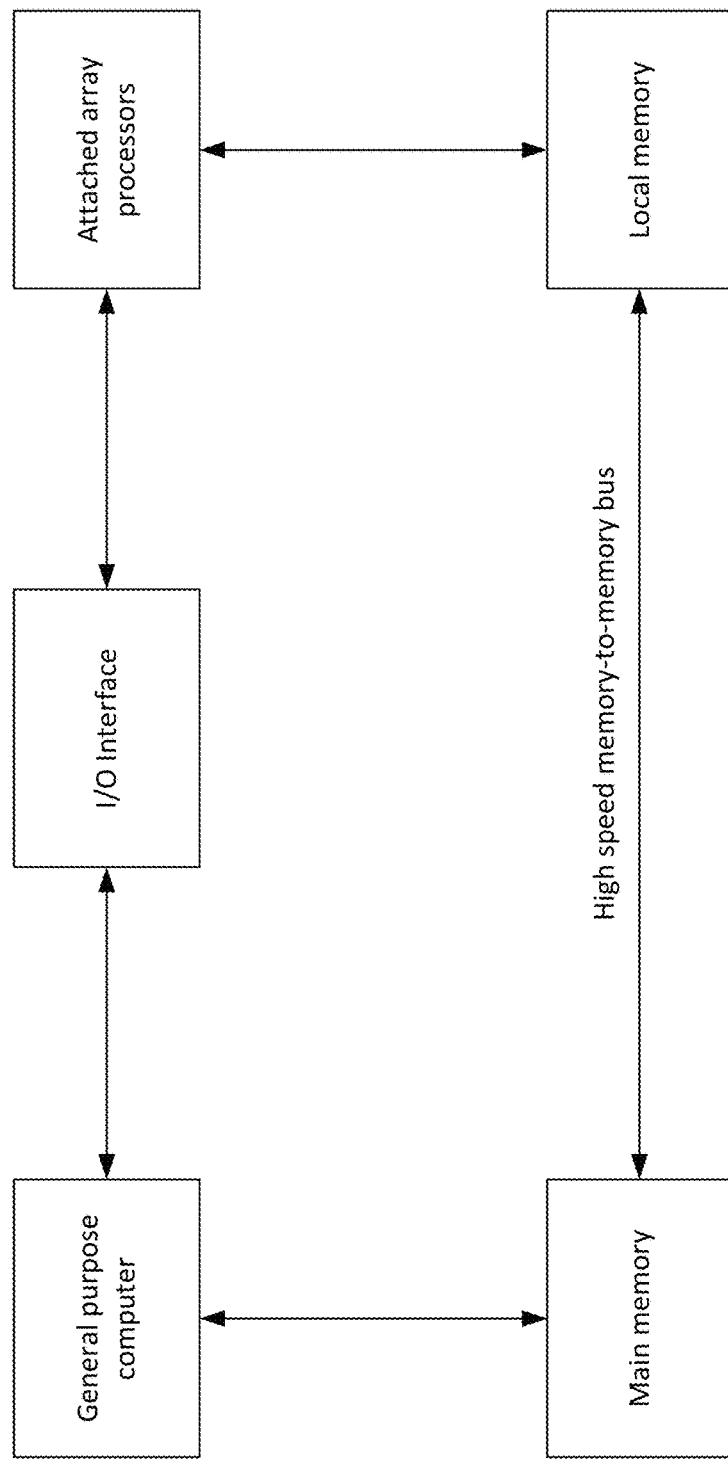
FIG. 1A illustrates an example of a conventional vector processor architecture.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Programmable Processing Array Operation

The programmable processing arrays as discussed in further detail herein may be implemented as vector processors (also referred to as array processors), which are a central processing unit (CPU) that implements an instruction set containing instructions that operate on one-dimensional arrays of data referred to as "vectors." This is in contrast to scalar processors having instructions that operate on single data items. Vector processors can greatly improve performance on certain workloads, notably numerical simulation and similar tasks, by utilizing a number of execution units that independently execute specific functions on incoming data streams to achieve a processing flow.

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will be repeatedly executed on another item of data, at an address one increment larger than the last. This allows for significant savings in decoding time.

Figure 1B:
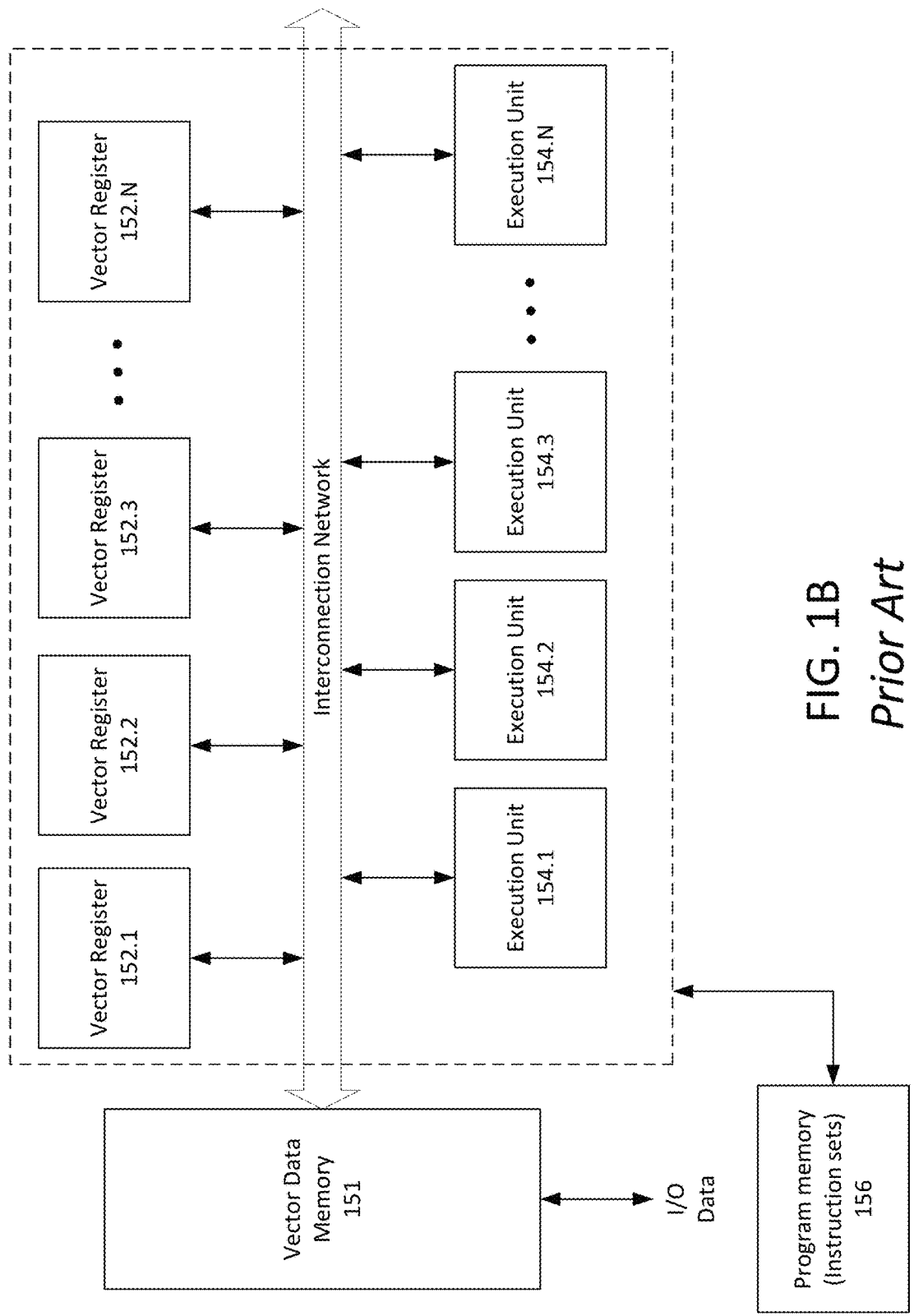
FIG. 1B illustrates another example of a conventional vector processor architecture.

Vector processors may be implemented in accordance with various architectures, and the various vector processor architectures as discussed throughout the disclosure as further described herein may be implemented in accordance with any of these architectures or combinations of these architectures, as well as alternative processing array architectures that are different that vector processors. FIGS. 1A and 1B provide two different implementations of a vector processor architecture. FIG. 1A illustrates an attached vector processor, which is attached to a general purpose computer for the purpose of enhancing and improving the performance of that computer in numerical computational tasks. The attached vector processor achieves high performance by means of parallel processing with multiple functional units, which may be alternatively referred to herein as execution units or processing units.

FIG. 1B, on the other hand, shows an example of a single instruction stream, multiple data streams (SIMD) vector processor. The vector processor architecture 150 as shown in FIG. 1B may have an architecture consisting of one or more execution units. Each execution unit is capable of executing one instruction. Each instruction can be a control, load/store, scalar or a vector instruction. Therefore, a processor with N execution units 104.1-104.N as shown in FIG. 1B can issue as many as N instructions every clock cycle. The execution units 104.1-104.N function under the control of a common control unit (such as processing circuitry), thus providing a single instruction stream to control each of the execution units 104.1-104.N. The I/O data as shown in FIG. 1B is typically identified with data communicated between the vector processor 150 and another data source or processor (which may be the common control unit or another processor) depending upon the particular application. The vector data memory 151 thus stores data received as input to be processed by the execution units 104.1-104.N, and data that is output or read from the vector data memory 151 after the data is processed. The vector processor architecture 150 as shown in FIG. 1B is an example of a load-store architecture used by vector processors, which is an instruction set architecture that divides instructions into two categories: memory access (loading and storing data between the vector data memory 151 and the vector registers 152.1-1502.N) and the vector processing operations performed by the execution units 154.1-154.N using the data retrieved from and the results stored to the vector registers 152.1-152.N.

Thus, the load-store instruction architecture facilitates data stored in the vector data memory 151 that is to be processed to be loaded into the vector registers 152.1-152.N using load operations, transferred to the execution units 154.1-154.N, processed, written back to the vector registers 152.1-152.N, and then written back to the vector data memory 151 using store operations. The location (address) of the data and the type of processing operation to be performed by each execution unit 154.1-204.N is part of an instruction stored as part of the instruction set in the program memory 156. The movement of data between these various components may be scheduled in accordance with a decoder that accesses the instructions sets from the program memory, which is not shown in further detail in FIG. 1B for purposes of brevity. The interconnection network, which supports the transfer of data amongst the various components of the vector processor architecture 150 as shown in FIG. 1B, is generally implemented as a collection of data buses and may be shared among a set of different components, ports, etc. In this way, several execution units 154.1-154.N may write to a single vector register 152, and the data loaded into several vector registers 152.1-152.N may be read by and processed by several of the execution units 154.1-154.N.

The use of instruction sets in accordance with the vector processor architecture 150 is generally known, and therefore an additional description of this operation is not provided for purposes of brevity. Regardless of the particular implementation, vector processors can greatly improve performance on certain workloads but have various drawbacks. For instance, and as noted above, vector processors may form part of what is referred to herein as a programmable array or a programmable vector array, which are traditionally computationally intensive, expensive, and suffer from power inefficiencies. As a result, such programmable vector engines may not be ideal for mobile or base station applications that implement DFE architectures. Furthermore, and as noted above, hardwired ASIC solutions are fast and efficient in terms of power consumption, but lack the flexibility provided by the programmable nature of the vector arrays.

Digital Pre-Distortion (DPD) Calculations

It is noted that current products such as DFEs typically implement either programmable or hardware-based solutions, each resulting in the tradeoffs as noted above. For instance, and as shown in FIG. 2A, DFEs may implement a hardwired ASIC to perform DFE functions such as DPD calculations. As further discussed below, DPD calculations are typically performed by sampling data at specific locations within an RF chain identified with the RF block, such as at the antenna. The sampled measurements are then used as feedback to calculate adapted DPD coefficients that are applied to the data stream prior to transmission to compensate for various non-linearities, memory effects, etc., of the RF chain components. Thus, a hardwired ASIC in such implementations represents a customized and optimized hardware solution that performs specific types of calculations, such as DPD calculations, in accordance with the specific set of operating parameters of the DFE. As a result, although such hardware ASIC solutions are fast and efficient in terms of power, such architectures lack flexibility and typically cannot be adapted to other DFEs or other applications.

Figure 2B:
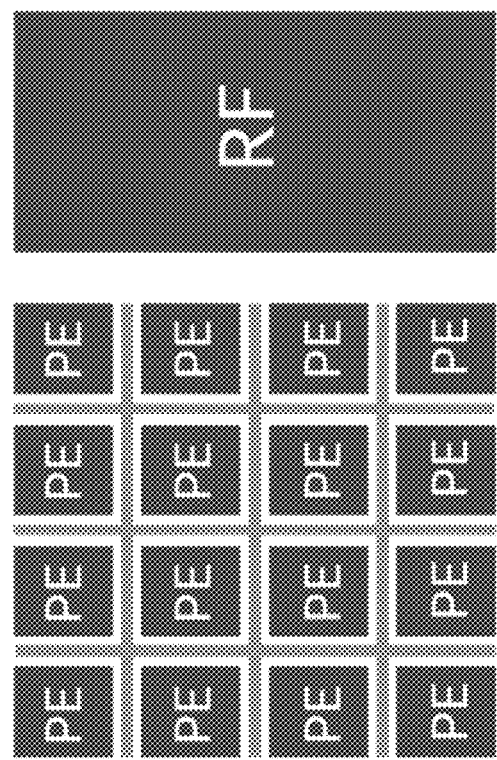
FIG. 2B illustrates programmable processing arrays for performing DPD computations.
Figure 2A:
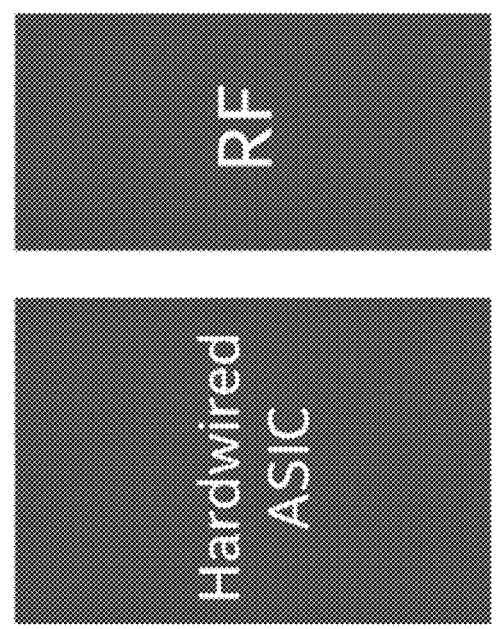
FIG. 2A illustrates a conventional hardwired solution for performing DPD computations.

Thus, other solutions for performing DPD computations include the use of programmable arrays as shown in FIG. 2B. Such solutions are typically field programmable gate arrays (FPGAs) or a mesh of processors with interconnections connecting the programmable processing elements (PEs), which provides some flexibility to adapt how various DFE-related functions are performed across different products. Thus, such solutions also function to sample data at specific locations within an RF chain, but alternatively implement the use of the PEs to perform the DPD calculations. As a result, such solutions provide flexibility to adapt the manner in which DPD calculations are performed, but do so using increased power and added cost compared to hardwired ASIC solutions.

Furthermore, to the extent that hybrid solutions are implemented, FPGA suppliers have elected to implement some of the processing components as hardware blocks. However, such products still fail to implement a hybrid solution in which the programmable components are realized as a programmable processing array. Moreover, such hybrid solutions are still not very power efficient, as these are based on FPGA solutions.

The disclosure as further described herein addresses these issues by implementing a hybrid approach that combines the benefits of a programmable processing array and a hardwired solution. To do so, the disclosure is directed to a hybrid architecture that couples a processing array to a hardware accelerator. This architecture dedicates the most computationally-intensive blocks to the hardware accelerator, which may include the DPD computation blocks in the context of a DFE, although the disclosure is not limited to this particular implementation. The DPD computation blocks may be implemented as software, hardwired, or a hybrid solution. In any event, as the state of the power amplifier (PA) of the DFE changes over time, the parameters of the DPD algorithm need to be continuously updated. This process is called "DPD adaptation," and involves a parameter optimization process that needs to consider the data sent to the PA and the data captured after the PA (i.e. as a form of feedback). However, the manner in which the data is captured, collected, and aligned for DPD adaptation efficiently has been an open problem.

Thus, the disclosure describes various solutions considering software, hardwired, or hybrid implementations for performing DPD computations, as well as various ways of processing the data for DPD adaptation. Furthermore, the disclosure describes an interface for coupling a processing array to a hardware accelerator, which achieves a division of functionality and connects the programmable processing array components to the accelerated hardware components without sacrificing flexibility. This results in a splitting of functionality and accompanying defined connections and interfaces to provide a balance between power/area and flexibility. This balance may represent an optimum balance, a balance in accordance with as predetermined, calibrated, and/or measured power/area and flexibility balance, etc.

As further described below, the disclosure implements such a hybrid solution by implementing a hardware accelerator for the most computationally-intensive blocks. For an implementation as part of a DFE, this may include the DPD computations. Thus, the hardware accelerator in accordance with such implementations is configured to compute a set of common lookup table (LUT) based memory terms, which may be used in accordance with any suitable number and/or type of DPD algorithm implementations. As further discussed below, the hardware accelerator is configured efficiently by having limited flexibility to select the number and type of terms up to a maximum number, which is 48 terms in the following illustrative scenario. Thus, and as further described below, the hardware accelerator may implement sets of LUTs that store entries identified with the terms of the particular function that is to be evaluated to output the hard-computed terms. The LUTs as described herein may have any suitable size and be identified with any suitable type of memory structure. The entries of the LUTs may thus represent evaluated values of a corresponding function, which may be represented in accordance with the terms of a function as denoted in the Equations 1 and 2 below. The entries of the LUTs used in this manner, i.e. the LUT based memory terms, are then multiplied by a set of data samples or any suitable function (such as a polynomial function). This process may then be repeated for any suitable number of delayed signal versions of the input signal, with the results being summed together as indicated in Equation 2 below to generate the hard-computed terms.

The DPD function may represent any suitable function that relates measured signal samples in the RF chain to provide adapted DPD coefficients as a function of those measured samples. For typical DFE applications, the DPD function represents a non-linear function of a complex signal represented as x. The DPD function typically depends on the history of the signal that is needed to model the memory effects of the power amplifier identified with the DFE RF chain. To provide further clarity, let $x_{-d}$ denote a complex value at a measured sample d from the past. A common model from literature is a polynomial function written in the form of Eqn. 1 below as follows:

$$\sum_p \sum_{d_1} \sum_{d_2} \cdots \sum_{d_p} \theta_{d_1, d_2, \ldots, d_p} x_{-d_1} x_{-d_2} \cdots x_{-d_p} \qquad \text{Eqn. 1}$$

where the signal values from different parts of the history defined by $d1, \ldots, d_p$ are combined together and multiplied by a corresponding parameter $\theta_{d1, \ldots, d_p}$. The delays $d1, \ldots, d_p$ and the corresponding parameters are typically determined for each power amplifier in the RF chain implementing the DFE via an optimization process. The variable p represents an order of the polynomial function, and determines the number of various delays d1 ... dp and terms x–d1.

Another common DPD function implementation is to use lookup (LUT) entries based on the signal magnitude to model the non linearity, and then model additional non-linearities using polynomial terms. Thus, if there are to be a maximum of K different terms, with K in the illustrative scenario used in Eqn. 2 below and referenced throughout the disclosure being 48, although the disclosure is not limited to this particular number of terms. A choice of terms common in the literature may be expressed in accordance with Eqn. 2 below as follows:

$$\sum_{d_1, d_2, d_3}^{48} LUT_{d_1, d_2, d_3} \qquad \text{Eqn. 2}$$

$$(|x_{-d_1}|)[x_{-d_2} \text{ or } x^*_{-d_2}]\left[x^2_{-d_3} \text{ or } |x^2|_{-d_3} \text{ or } 1\right][sc \text{ or } 1]$$

where there are 48 different combinations of the delays d1, d2, d3 and corresponding LUTs for additional polynomial multiplier terms.

The above-referenced Equations are provided for clarity and in a non-limiting sense. Indeed, a large variety of approaches exist to model power amplifiers for the calculation of DPD coefficients. However, the most common approach is to sum the various non-linear terms as explained above. Other approaches to model long term effects involve averaging the signal from the past. Such terms may have the same form as above, although the signal x is replaced by a long term running average of the signal.

In any event, the optimal solution and required DPD terms depend upon the power amplifier used in the system. Parts of the non-linearity may be modelled by the common terms above, but often there is a need for more specific terms, i.e. DPD coefficients or parameters. Therefore, the hybrid solution to which the disclosure is directed implements a set of most common terms in the hardware accelerator lookup table (LUT) entries and also enables the flexibility to add new terms in a programmable manner to fine tune and improve the performance for any new power amplifier. The additional terms may include any suitable terms that may impact the DPD calculation and thus the performance of the PA in which the DFE is implemented. Some non-limiting terms include polynomial and LUT-based terms not computed or known by the hardware accelerator, terms with long term averages and/or a long term history of the signal to model the long term effects, etc.

DPD Adaptation Architecture Implementation

Figure 3:
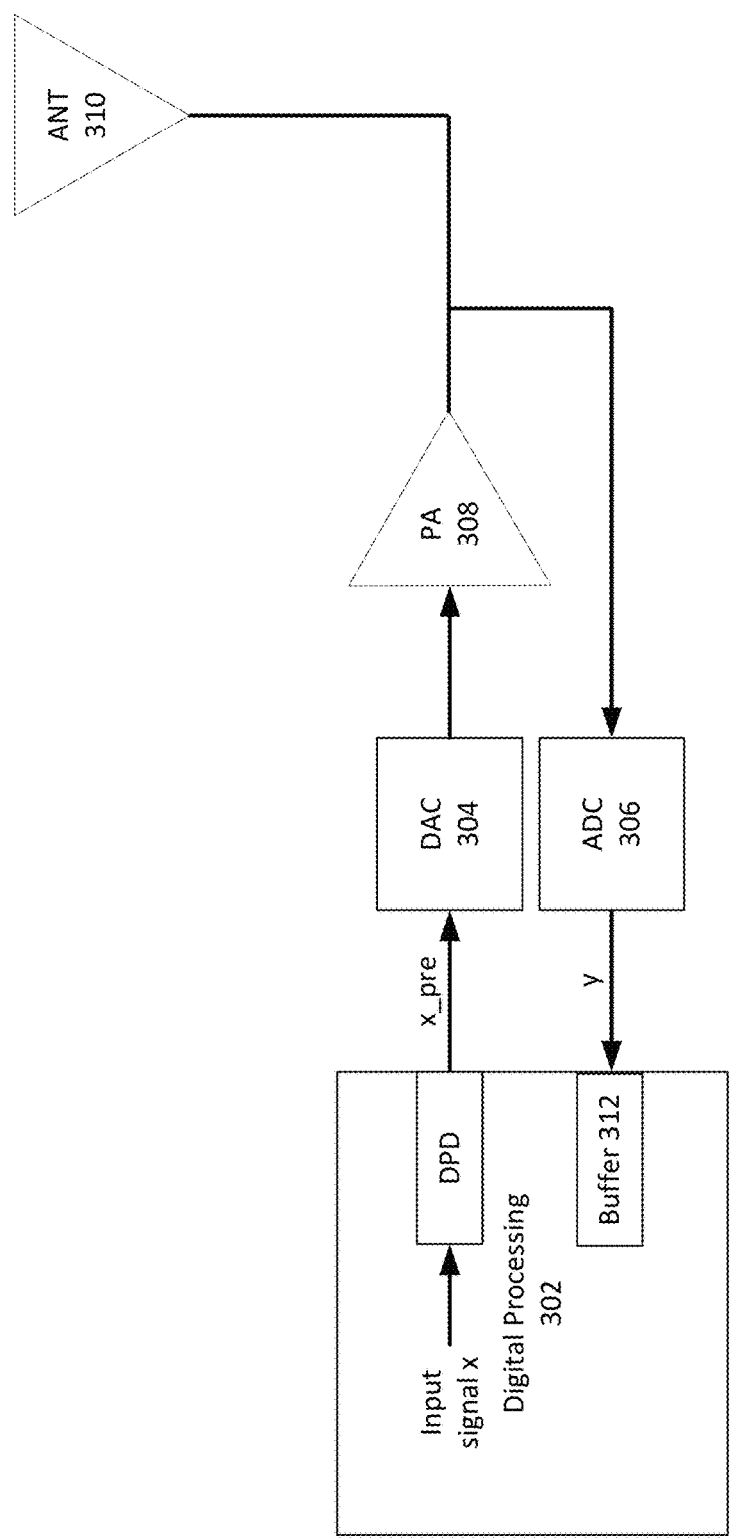
FIG. 3 illustrates a schematic block diagram of a radio system with feedback for performing DPD adaptation computations, in accordance with the disclosure.

FIG. 3 illustrates a schematic block diagram of a general radio system with feedback for performing DPD adaptation computations, in accordance with the disclosure. The block diagram 300 represents the processing components or blocks, as well as the RF components of a radio architecture 300 that may be implemented to wirelessly transmit and/or receive data signals in accordance with any suitable communication protocol. For conventional systems, the digital processing block 302 is typically identified with a hardwired solution, as shown in FIG. 2A, or a programmable array as shown in FIG. 2B. However, in accordance with the techniques as discussed throughout the disclosure, the digital processing block 302 may implement a hybrid programmable processing array and hardware accelerator architecture as discussed in further detail below.

The radio architecture 300 is shown in FIG. 3 as including a DAC 304, a power amplifier (PA) 308, an ADC 306, and an antenna 310. The radio architecture 30 may of course include additional or alternate components as shown in FIG. 3, with the components being shown being for brevity and ease of explanation. The radio architecture 300 may implement any suitable type of components typically present in wireless radio architectures such as mixers, local oscillators, upconverters, downconverters, filters, etc.

In any event, the digital processing block 302 is configured to calculate an initial set of preprocessed data samples denoted as x_pre, which is the result of the digital pre-distortion processing on an input data signal x for a current set of parameters. That is, the DPD block as shown in FIG. 3 represents an application of a set of DPD parameters to an input signal x to provide the pre-processed data (i.e. the pre-distorted data) x_pre. Thus, the initial set of preprocessed data samples x_pre may represent a digital data stream or any suitable number of data samples of pre-distorted data that are to be transmitted, which represent the application of an initial or previous set of DPD terms which may include parameters or coefficients) as discussed in further detail below. The preprocessed data x_pre is then sent to the DAC 304, which converts the digital preprocessed data to an analog signal that is then provided to the PA 308, output as an amplified output signal, and provided to the antenna 310 for transmission. The analog signal output via the PA 308, i.e. the amplified signal to be transmitted, is sampled or captured as feedback and coupled to the ADC 306, which converts the analog output signal to a digital output signal, as shown in FIG. 3, which represents digital samples of the output signal data y. It is noted that both the preprocessed data x_pre and the output signal data y may be further processed by additional components of the radio architecture 300, such as via up-sampling and down-sampling filters.

DPD Parameter Adaptation

As noted above, DPD computations may be performed in various ways using feedback from data after a PA (i.e. the output signal data y) or from another location in a transmit chain of a radio system. However, once the DPD terms are calculated, these may need to be modified or adapted over time as part of a process referred to herein as DPD adaptation. The use of the term "terms" as used herein in this context may refer to any suitable type of function, such as a non-linear function, which has a corresponding coefficient. Thus, the term(s) may represent any parameters associated with the corresponding function (such as a non-linear function), although typical applications include the term being synonymous with a single multiplicative coefficient, making the final solution easier to compute Thus, in such a case the DPD terms may be synonymous with the DPD parameters, which may encompass the DPD coefficients. The DPD adaptation process may be triggered in response to various conditions, statistics measured from the input signal x, the output signal y, and/or the preprocessed data x_pre, performed periodically etc. In some scenarios, a processing statistic for this purpose may include computing an averaging signal power over a specific period of time and identifying a sudden change of the signal power. The DPD adaptation process is further described below, and functions to dynamically and continuously modify the DPD parameters in response to changes in environmental or other operating conditions, such as variations over time in the performance and/or operation of the PA 308. To provide additional clarity in this regard, a more detailed explanation of the DPD adaptation process is warranted, which is provided below.

Using the same notation as provided above with reference to FIG. 3, the preprocessed data x_pre is generated by applying DPD coefficients, which again may alternatively be referred to herein as DPD terms or DPD parameters, to an input signal x. Of course, the preprocessed data x_pre may represent the application of other additional or alternative terms to the input signal x, although the use of DPD parameters is used in this scenario for ease of explanation. The input signal x may represent digital data to be transmitted, which may be provided via a modem or other suitable data source. The following function, which is denoted as DPD in Eqn. 3 below, represents a preprocessing function that is applied to the input signal x to derive the preprocessed data x_pre, and includes the application of the DPD parameters θ.

$$x_{pre}=DPD(x,\theta) \quad \text{Eqn. 3:}$$

The preprocessing function DPD may be implemented using any suitable techniques, including known techniques. In one scenario, the DPD function may be implemented as a Volterra polynomial series. In any event, the preprocessed data x_pre is generated using the predetermined DPD function in this way, which includes an application of a current set of DPD parameters to an input signal x. The digital signal x_pre is then converted to an analog signal and provided as an input to the PA 308 as noted above. As shown in Eqn. 4 below, the PA function denotes the dynamically changing characteristics of the PA 308 and the impact on the preprocessed data x_pre. In other words, Eqn. 4 below shows that the output data signal y, which is sampled at the output of the PA 308 and converted to a digital data stream as noted above, is a function of the characteristics of the PA 308 on the amplified preprocessed data x_pre.

$$y=PA(x_{pre})$$ Eqn. 4:

Thus, the goal of the DPD parameter optimization is to find the DPD parameters θ such that the output signal y has some desired properties, i.e. meets or exceeds one or more predetermined or otherwise established conditions, thresholds, etc. In one scenario, this might include ensuring that the output signal y has an Adjacent Channel Leakage Ratio (ACLR) below a predetermined threshold value such as −33 dB, −43 dB, etc. As another scenario, this may include the output signal y having an error vector magnitude (EVM), sometimes also called relative constellation error or RCE) below a threshold percentage value such as 3%. The EVM is a known measure used to quantify the performance of a digital radio transmitter or receiver.

Thus, and as shown in FIG. 3 above, the preprocessed data x_pre is sent to the DAC 304 and the PA 308, and may be further subjected to additional digital processing (not shown) such as up-sampling, down-sampling, filtering, IQ imbalance correction, etc. The output data y may be stored in a memory buffer 312. The output data y stored in the buffer 312 is processed via the digital processing block 302. The digital processing block 302 may be implemented as one or more dedicated PEs of a programmable array and a central processor unit (CPU). The DPD parameter adaptation may be fully performed by the PEs, or be pre-processed and sent to the CPU for further processing. The preprocessing in such scenarios may include subsampling, up-sampling, filtering, time alignment, correlation computation, covariance matrix computation, data compression, etc. In some cases, the stored output data y may be sent directly to the CPU.

Techniques used to perform data synchronization and DPD adaptation in accordance with the radio architecture 300 are further discussed below with reference to FIGS. 4A and 4B. For each of these techniques, the synchronization and DPD adaptation processing may be performed via the PEs of the processing array and/or the CPU that are implemented as part of the digital processing block 302. The techniques as shown in FIGS. 4A and 4B may represent known techniques for calculating DPD parameters as discussed herein.

Figure 4A:
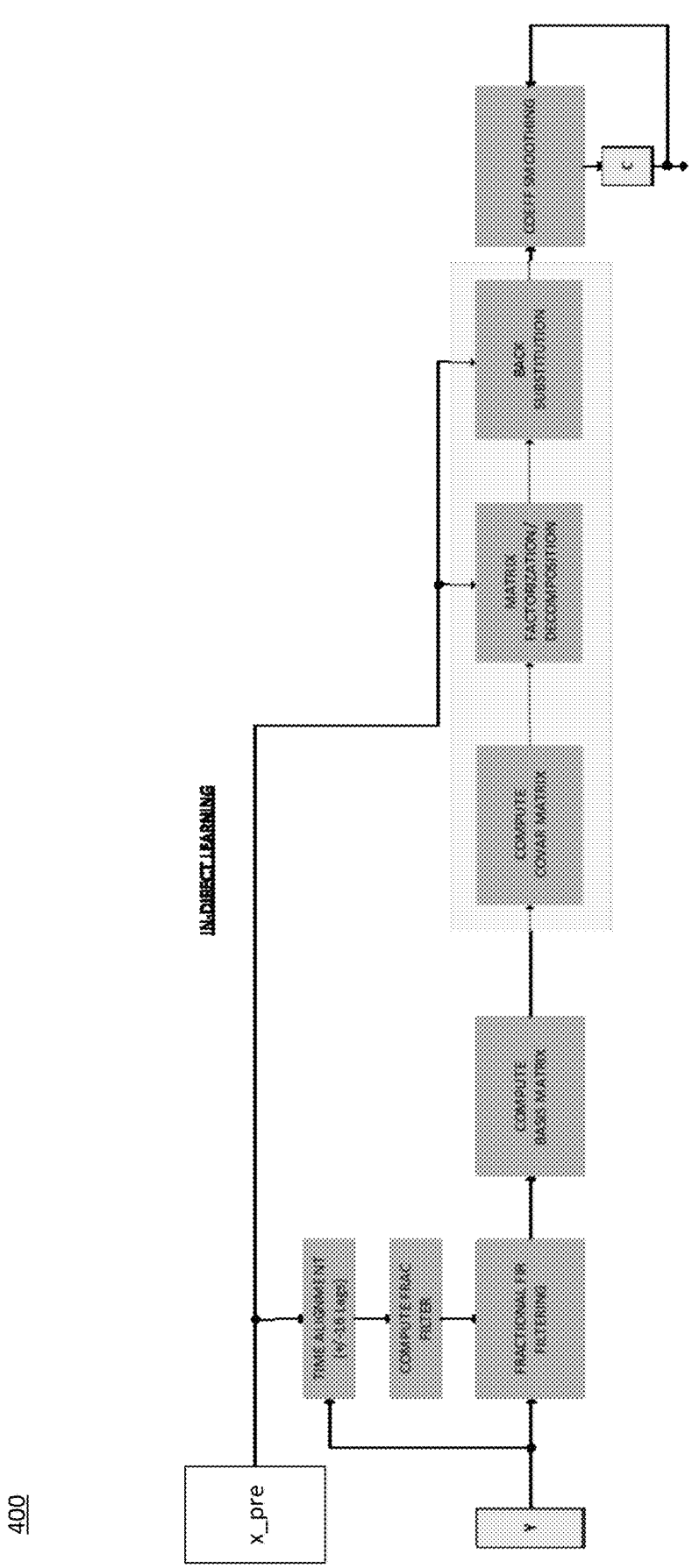
FIG. 4A illustrates a direct learning approach for performing synchronization and DPD adaptation processing, in accordance with the disclosure.

FIG. 4A illustrates a direct learning approach for performing synchronization and DPD adaptation processing, in accordance with the disclosure. The 'x' and 'y' data bocks as shown in FIGS. 4A and 4B correspond to the digital data identified with an input signal x and a sampled output signal y, respectively. Thus, the x data block may represent data provided by a modem or other suitable data source of a wireless communication device, as noted above. The y data block may represent data identified with the output data signal that is sampled from the output of the PA or other suitable portion of a transmit chain. The 'c' data block may represent the DPD parameters that are calculated in accordance with each respective technique as shown in FIGS. 4A and 4B.

For the indirect learning approach as shown in FIG. 4A, the data identified with the preprocessed data x_pre is time-aligned with the output data signal y data samples measured from the output signal after conversion to digital data samples with the ADC. Once time alignment has been completed, fractional filter coefficients are computed to perform finite impulse response filtering on the y output data samples. A basis matrix is then computed from the output of these filtered samples, followed by a covariance matrix computation. The data samples of the preprocessed data x_pre are then used to perform covariance matrix factorization and decomposition and back substitution. A coefficient smoothing operation is then provided to compute the DPD terms, which may include the parameters and/or coefficients as noted above, represented in block C. These DPD terms may then be applied to the preprocessed data x_pre to provide another preprocessed data x_pre as noted above. This process may be iteratively repeated over time as additional data is transmitted, such that the DPD terms are modified, re-applied to new data input signals x, and so on. Thus, an indirect learning approach uses an x_pre that is already computed and attempts to match the computed x_pre data to an output data y.

Figure 4B:
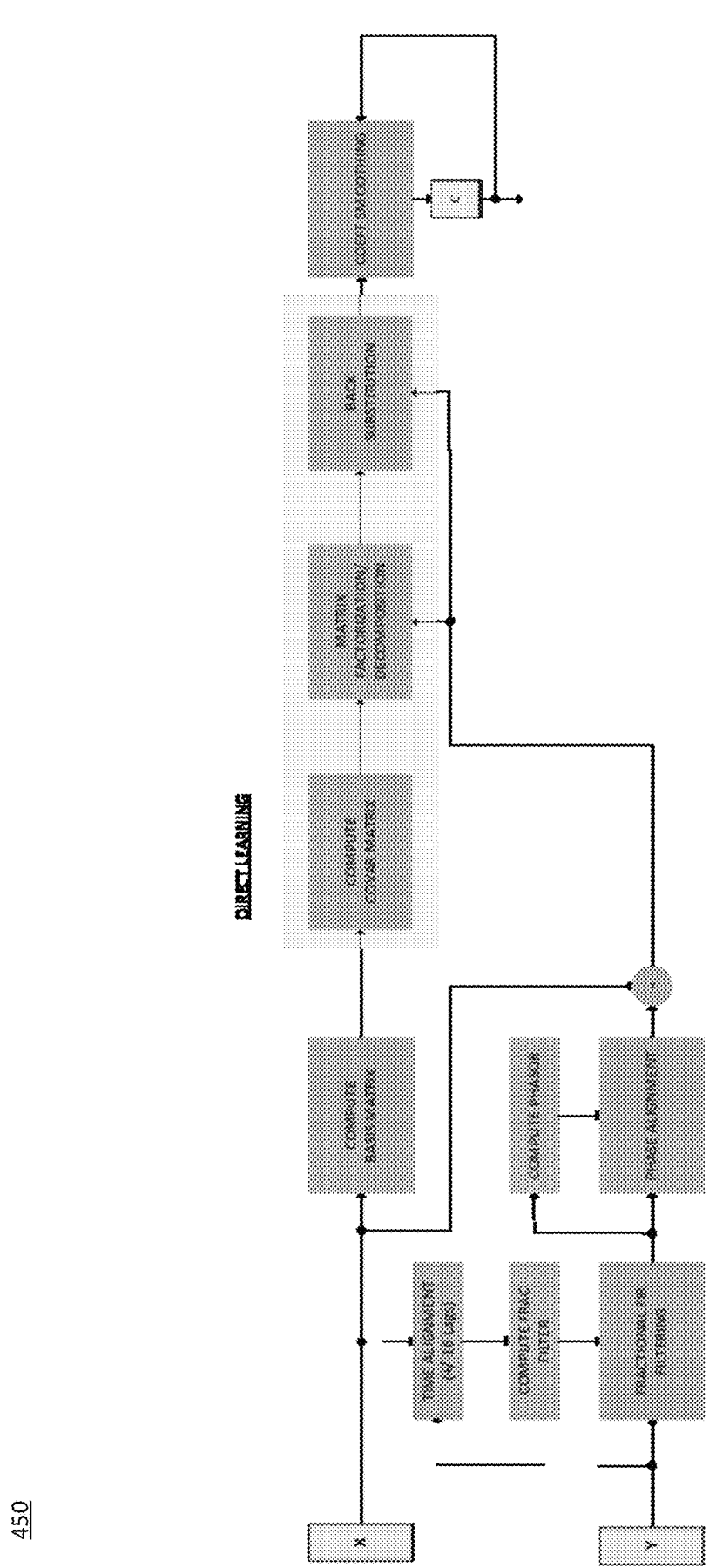
FIG. 4B illustrates an indirect learning approach for performing synchronization and DPD adaptation processing, in accordance with the disclosure.

FIG. 4B illustrates a direct learning approach for performing synchronization and DPD adaptation processing, in accordance with the disclosure. The direct learning approach as shown in FIG. 4B implements the data samples of the input data signal x and the output data signal y data samples measured from the output signal after conversion to digital data samples with the ADC. However, the direct learning approach as shown in FIG. 4B computes the basis matrix directly from the data samples of the input data signal x. The time alignment is performed as shown in FIG. 4B, with the fractional filter coefficients being computed to perform finite impulse response filtering on the y output data samples. A phasor is then computed using the filter output signal data samples, which is used for phase alignment. Once phase aligned, the output signal data samples are subtracted from the input signal data samples, with the resulting difference being used to compute the matrix factorization and decomposition and back substitution computations. A coefficient smoothing operation is once again performed to obtain the DPD parameters, which are applied to the input signal data x to generate the preprocessed data x_pre as noted above. Like the indirect learning approach of FIG. 4A, the direct learning approach may also be repeated iteratively to adapt the DPD terms over time.

The disclosure is directed to techniques as described in further detail below to implement a hybrid programmable array and hardware accelerator architecture to perform DPD parameter adaptation. The DPD parameter computation and adaptation processes may be executed in accordance with any suitable techniques, including known techniques, and may include the use of the direct and indirect learning approaches as shown and discussed above with reference to FIGS. 4A and 4B. To do so, the disclosure implements a data interface that functions to transfer data samples from a processing array architecture to a hardware accelerator architecture, and vice-versa. The details of this hybrid architecture is discussed further below with reference to FIGS. 5A-5B and 6A-6D.

FIGS. 5A-5B illustrate schematic block diagrams of a hybrid programmable processing array and hardware accelerator architecture, in accordance with the disclosure. The hybrid architectures 500, 550 are each identified respectively with an overall data flow, the further details of which are provided below. Each of the hybrid architectures 500, 550 as shown in FIGS. 4A-4B includes similar or identical components, and thus the differences between the various hybrid architectures are discussed in detail herein with the assumption that the common components thereof may be implemented in the same or identical manner and perform the same or identical functions. One or more of the various components of the hybrid architectures 500, 550 may be implemented on a single chip, such as a system on a chip (SoC), or on separate chips or SoCs. In one illustrative scenario, the processing array 502, the data interface 504, and the hardware accelerator 506 may be implemented on the same SoC, which may include additional components. The implementation of the architectures 500, 550 as part of a SoC may be particularly advantageous for applications using high data rates, as doing so obviates the need to couple data signals between different chips or via other external devices. In any event, each of the hybrid architectures 500, 550 as shown in FIGS. 5A and 5B, respectively, includes a processor 501, a processing array 502, a data interface 504, a hardware accelerator 506, a processing block 508, and a radio frequency (RF) front end 510.

Again, the hybrid architectures 500, 550 as shown in FIGS. 5A-5B may be implemented to perform DPD parameter computation and adaptation in accordance with any suitable techniques, including known techniques and those discussed herein. The hybrid architectures 500, 550 may additionally or alternatively be used to perform any suitable type of data computations or other functions in which data processing operations may be performed on arrays of data samples via a processing array and a hardware accelerator being implemented in conjunction with the processing array.

As discussed in further detail below, each hybrid architecture 500, 550 includes a processor 501, which may be implemented as any suitable number and/or type of processors, processing circuitry, software, or combinations of these. The processor 501 may be implemented as a central processing unit (CPU) of a relevant system in which the hybrid architectures 500, 550 are implemented, and may be identified with a CPU of the digital processing block 302 as discussed above with reference to FIG. 3. Thus, the processor 501 may function to control the device and/or other components of the device in which the hybrid architectures 500, 550 are implemented. The processor 501 may be identified with one or more processors such as a host processor, one or more microprocessors, graphics processors, baseband processors, microcontrollers, an application-specific integrated circuit (ASIC), part (or the entirety of) a field-programmable gate array (FPGA), etc.

In any event, the processor 501 may be configured to carry out instructions to perform arithmetical, logical, and/or input/output (I/O) operations, and/or to control the operation of one or more components of the device in which the hybrid architectures 500, 550 are implemented to perform various functions as described herein. The processor 501 may include one or more microprocessor cores, memory registers, buffers, clocks, etc., and may generate electronic control signals to control and/or modify the operation of the components and/or device in which the hybrid architectures 500, 550 are implemented. The processor 501 may communicate with and/or control functions associated with the processing array 502, the data interface 504, the processing block 508, and/or the RF front end 510.

As discussed in further detail below, each hybrid architecture 500, 550 includes a processing array 502, which may be implemented as any suitable type of programmable array architecture that includes an array of processing elements (PEs), and which may constitute any suitable number and/or type of PEs having any level of programmable functionality. In some scenarios, the processing array 502 may be implemented as a programmable vector processor having any suitable configuration and design as noted herein. As noted above, a vector processor may include any suitable type of processor that implements an instruction set using instructions designed to operate efficiently and effectively on large one-dimensional arrays of data samples referred to herein as vectors or data vectors. The processing array 502 may, when implemented as a vector processor, implement as the PEs any suitable number of execution units, which may also be referred to as cores, and which may be configured in any suitable manner as further discussed herein. In other scenarios, the processing array 502 may alternatively be implemented with any suitable number of alternate PEs. In accordance with such alternative scenarios, the processing array 502 may include, as the PEs, digital signal processor (DSP) blocks and/or PEs identified with an FPGA, individual DSP processing blocks of a larger DSP, etc.

In any event, the processing array 502 may receive, transmit, and/or perform processing operations on arrays of data samples, which may alternatively be referred to herein as data vectors regardless of the particular implementation of the processing array 502. Each data vector may thus represent an array of any suitable number of data samples. The processing array 502 provides flexibility in the computations performed, as the processing array 502 may access instruction sets or otherwise be programmed to perform specific functions, which may include processing operations, the specific type being a function of the particular implementation of the processing array 502 and instructions that are executed at a particular time. That is, scenarios include the PEs of the processing array 502 performing processing operations or other suitable operations on the arrays of data as discussed herein to provide data bit manipulation, formatting, truncation, mathematical computations, etc.

The data interface 504 functions to transfer the array of data samples from each PE of the processing array 502 after processing operations have been performed to the hardware accelerator 506. Data transfers between the hardware accelerator 506 and the processing array 502 are likewise enabled via the coupled data interface 504. As discussed in further detail below, the data interface 504 may implement any suitable type and/or number of hardware and/or software components, memory buffers, etc., to manage the translation of data from the arrays of data samples implemented via the processing array 502 to a data format implemented via the hardware accelerator 506, and vice-versa (i.e. when data is provided from the hardware accelerator 506 to the processing array 502). The data interface 504 also manages synchronization between the processor 501 and/or the processing array 502 and the hardware accelerator 506.

As shown in FIGS. 5A-5B, each hybrid architecture 500, 550 also includes a hardware accelerator 506, which is configured to execute predetermined functions in accordance with any suitable type of hardwired architecture as noted herein, such as ASIC, a DSP, etc. The hardware accelerator 506 may implement any suitable number and/or type of processors and/or processing circuitry for this purpose, which may be partially or wholly represented by the HW circuitry blocks as shown. The HW circuitry blocks may include any suitable number of LUTs containing entries that are based upon the particular computational application for which each hybrid architecture 500, 550 is implemented. Although the hardware accelerator 506 is described herein as implementing a set of LUTs, the disclosure is not limited to the HW circuitry implementing LUTs in this manner to perform the HW term computation (i.e. the "hard-computed" terms). Instead, and as further discussed below, the hardware accelerator 506 may perform the HW term computation using a sum of terms that are derived in any suitable manner, which may be via the LUTs as described herein or via the evaluation of any suitable function. The use of LUTs may be particularly useful, however, for more complex functions In any event, the hardware accelerator 506 is configured to compute the DPD parameters in accordance with a predetermined processing function using the array of data samples transferred via the data interface 504. The DPD parameters may represent a portion or entirety of processed data samples that include a set of computed terms in accordance with the particular application for which the function or LUT entries corresponds, as the case may be.

In this way, the hardware accelerator is configured to compute initial set of "hard" computed DPD parameters, which may be further modified and/or combined with "soft" computed DPD parameters that are computed via the processing array 502 to provide the preprocessed data x_pre as discussed herein. The hard-computed DPD parameters may be identified with a set of processed data samples output via the hardware accelerator 506 in accordance with the particular application for which the LUT entries correspond.

It is noted that the term "initial" as used herein in the context of the hard-computed DPD terms (which again may include the DPD parameters) refers to a computation of hard-computed DPD parameters that may be subsequently combined with additional soft-computed DPD parameters and/or further modified to generate the preprocessed (i.e. pre-distorted) data samples to be transmitted. In each case, it is assumed that the hard-computed DPD parameters are computed by the hardware accelerator 506 at some time after startup, as the DPD parameters are then iteratively computed as part of the adaptation process as noted herein. During startup, however, it is noted that the hard-computed terms may alternatively be predetermined and/or computed offline and passed to the hardware accelerator 506 (i.e. stored as a set of LUT entries). This may include the PEs of the processing array 502 providing the predetermined values, random values, etc. as a starting point for the DPD parameter adaptation process. Thus, the hard-computed terms at startup may be initially set versus being computed by the hardware accelerator 506, and thereafter be adapted in accordance with the techniques discussed herein.

As shown in the scenario illustrated in FIGS. 5A-5B, the hardware accelerator 506 may implement as the HW circuitry blocks any suitable number K (such as 48) of LUTs depending upon the overall number of terms (such as the 48 as noted above), each containing a set of digital data entries or values. The entries in the set of LUTs may correspond to a set of computed DPD parameters that enable a particular DPD function to be evaluated using received data samples as inputs, which may include the array of data samples provided by the data interface 504 after the processing operations have been performed via the PEs of the processing array 502. Thus, when the LUTs are implemented in this manner, the hardware accelerator 506 facilitates the HW term computation via a summation of terms, which may be non-linear terms or any other suitable type of terms that are derived from the entries in the set of LUTs. This may include the use of a predetermined processing function, such as a digital pre-distortion (DPD) function as noted herein as a non-limiting scenario. In such a case the hardware accelerator 506 is configured to compute, as the DPD parameters in accordance with the DPD function, DPD coefficients used for a wireless data transmission.

Therefore, in a non-limiting scenario, the set of LUTs implemented via the hardware accelerator 506 may contain entries corresponding to the DPD terms (i.e. parameters or coefficients) as noted above, which may represent non-linear terms, and thus the hardware accelerator 506 functions to identify DPD terms for a particular digital data stream in this scenario by mapping (i.e. correlating) the array of data samples provided by the data interface 504 to entries in the number of K LUTs, which may represent one phase of the overall computation used to generate the hard-computed DPD terms as discussed in further detail herein. That is, the hardware accelerator 506 may generate the hard-computed terms in this way in accordance with the Equations 1 and 2 above (or any other suitable techniques) by passing the array of data samples through the LUTs of the HW circuitry, which are then multiplied by the array of data samples or any suitable function (such as a polynomial function). This process may then be repeated for various delayed signal versions of the input signal x, with the results being summed together as indicated in Equation 2 above to generate the hard-computed terms.

In other words, the hardware accelerator 506 is configured to compute the set of terms in accordance with a predetermined processing function by computing a sum of terms (such as non-linear terms) contained in the LUT entries using the array of data samples transferred via the data interface. Of course, the use of the hardware accelerator 506 to perform DPD parameter computations, as well as the use of LUTs, are non-limiting scenarios that are provided for clarity and ease of explanation. The hardware accelerator 506 may implement any suitable number of LUTs and perform any suitable number and/or type of computations to evaluate any suitable type of predetermined mathematical function in accordance with a particular application. As another illustrative scenario, and as mentioned above, the hardware accelerator 506 may additionally or alternatively compute the set of HW terms in accordance with a predetermined processing function by summing terms (such as non-linear terms) in accordance with the evaluation of any suitable type of function. This function may be a polynomial function or any other suitable type of function that is based upon the particular application and/or implementation, and which may include the polynomial function(s) and techniques as described herein with reference to Eqns. 1-2.

FIGS. 5A and 5B provide two illustrative scenarios for the implementation of a hybrid architecture that includes the programmable processing array 502 and the hardware accelerator 506. These scenarios are shown in a non-limiting manner for ease of explanation and clarity. Although the initial data flow 'B' as noted herein is the same for both of these architectures, the data flow implemented in each of the hybrid architectures 500, 550 differs from one another after the initial data flow has been completed.

Depending upon the current instructions provided to the individual PEs of the processing array 502, the PEs may or may not modify the values of the data samples, as further discussed herein. In some scenarios, the PEs may receive an array of data samples, which are then transferred to the hardware accelerator 406 without modifying their values as a result of the execution of the processing operations. This may include the use of processing operations that may reorder, reformat, or reorganize the arrays of data samples. In other scenarios, the processing operations may include modifying the array of data samples, which are then output as "soft" computed terms (as shown in FIG. 4A) or as soft computed modified terms (as shown in FIG. 4B).

For each of the hybrid architectures 500, 550 as shown in FIGS. 5A and 5B, the processing array 502 receives digitized data samples corresponding to an input signal x. Again, the input signal x may be identified with a signal to be wirelessly transmitted, and the digitized data samples may be provided via a modem or any suitable data source depending upon the particular application. The data samples identified with the input signal x may be in the format of an array of data samples as discussed above, such that the PEs of the processing array 502 may receive and optionally process the data samples as noted herein.

With reference to FIG. 5A, the hardware accelerator 506 initially computes the DPD parameters as noted herein using the data samples identified with the input data signal x, which are provided via the data interface 504. To do so, and as noted above, the hardware accelerator 506 may implement any suitable number of LUTs, the entries of which corresponding to an initial set of hard-computed DPD parameters as a result of mapping the data samples received from the processing array 502 (i.e. the data samples identified with the input signal x) to LUT entries and performing multiplication and summation operations. However, because the DPD parameters are modified over time, the hardware accelerator 506 may store two (or more) sets of LUT entries (i.e. an A and B set of DPD parameter entries). That is, the hardware accelerator 506 may store different indexed sets of LUT entries (i.e. A and B), one corresponding to a currently used set of DPD parameters, and another corresponding to a modified set of DPD parameters to be used for future data transmissions. A second set of DPD parameter entries are used as opposed to overwriting a single set of LUT entries to account for delays between subsequent data transmissions. In other words, data transmissions may occur concurrently with the computation of adapted DPD parameters, such that the updated DPD parameters are written to the entries in the LUTS corresponding to the currently unused DPD parameters. In this way, the LUT entries always provide for a DPD parameter computation, which may be in accordance with a current or modified set of DPD parameters as noted in further detail herein. For this current (i.e. initial) data flow, it is assumed that the DPD LUT entries in the 'A' LUT are referenced to provide the preprocessed data x_pre.

In some cases, these hard-computed DPD parameters may be the same as the preprocessed data samples x_pre, i.e. when there is no optional soft-computed DPD parameters output by the processing array 502 as noted herein. However, the hybrid architecture 500 as shown in FIG. 5A also implements summation circuitry (also referred to herein as an adder) that optionally couples the "hard" computed DPD parameters, i.e. the DPD parameters computed via the hardware accelerator 506 with additional "soft" computed DPD parameters, i.e. DPD parameters computed by the PEs of the processing array 502. That is, one or more of the PEs of the processing array 502 may perform processing operations on an array of data samples identified with the data input signal x to generate an array of processed data samples that include the application of a set DPD parameters that include both hard- and soft-computed terms. These additional soft-computed DPD parameters are converted from the array of data samples used by the PEs of the processing array 502 to a format that is implemented by the hardware accelerator 506. It is noted that the soft-computed terms as discussed herein may include their own parameters that may also be updated, together or separately, from the hard-computed terms. In any event, the data interface 504 also synchronizes the set of additional soft-computed terms with the set of hard-computed terms computed via the hardware accelerator 506, i.e. the terms computed by correlating a separate array of data samples received via the data interface 504 with the LUT entries and once again performing the multiplication and summing operations. Thus, the preprocessed data x_pre may correspond to an application (to the input signal x) of DPD parameters that include only the hard computed terms provided by the referenced LUT entries of the hardware accelerator 506 or, alternatively, an application of DPD parameters that include a combination of the hard-computed terms and additional soft-computed terms.

In this way, the hybrid architecture 500 facilitates the processing array 502 optionally providing additional soft-computed terms that may be added (synchronously) to the set of hard-computed terms computed by the hardware accelerator 406 to provide a set of processed data samples x_pre that includes the application of both sets of terms to an input data signal x. The additional soft-computed terms may be calculated via the processing array 502 in a fully flexible manner, as the processing array 502 is a programmable component and may perform processing operations via the PEs in accordance with a modifiable instruction set. Thus, the order, type, and manner in which the processing operations are executed on arrays of data samples via the PEs of the processing array 502 may be modified via alteration of the instruction sets used by the processing array 502. Again, in some non-limiting scenarios, these additional soft-computed terms may include DPD parameters for correcting long-term effects or trapping effects in some power amplifiers, IQ imbalance correction, etc. In this way, the hardware accelerator 506 functions to provide common computations of DPD terms that are not as likely to change over time, whereas the additional terms computed by the processing array 502 may address other operating parameters of the power amplifier or components in the RF chain that may vary over time or are otherwise less predictable.

The preprocessed data x_pre, once calculated in accordance with the hybrid architecture 500, may then be output as preprocessed data samples to the processing block 508 for further digital processing. The preprocessed data samples x_pre may also be fed back to the processing array 502 and/or the processor 501 for use as part of the DPD parameter adaptation computations as noted above. The data samples identified with the preprocessed data x_pre may be transferred to the processing array 502 via the data interface 502 as noted in further detail below, and optionally be provided to the processor 501. The DPD adaptation computations may be performed via any suitable combination of the processing array 502 and/or the processor 501 depending upon the particular implementation and application.

The processing block 508 may represent any suitable number and/or type of processors, processing circuitry, hardware components, and/or software components depending upon the particular application. As one illustrative scenario, the processing block 508 may be identified with the up-conversion of the preprocessed data x_pre to a transmission frequency, additional filtering, etc. After processing via the processing block 508 of the x_pre preprocessed data, the data samples are then converted to an analog signal via the DAC as shown in FIG. 5A and provided to a PA, which generates the output signal y for data transmission via the antenna as shown.

The hybrid architecture 500 samples the output data signal y from the output of the PA as shown in FIG. 5A, which is digitized into output signal data samples via the ADC and stored in a buffer that is part of the processing block 508. The data samples identified with the output signal y are then transferred to the processing array 502 via the data interface 502 as noted in further detail below, and optionally provided to the processor 501. Thus, the DPD adaptation computations may be performed via any suitable combination of the processing array 502 and/or the processor 501 using any suitable combination of the input data x, the preprocessed data x_pre, and/or the sampled output data signal y.

Once the DPD adaptation computations have been completed, the updated DPD parameters may then be stored as the updated DPD LUT entries used by the hardware accelerator 506 (i.e. one of the sets A or B). In other words, the DPD LUTs implemented via the HW circuitry may store two sets of DPD parameter entries (i.e. A and B entries) such that the hardware accelerator 506 may be switched to implement the new updated DPD parameters once these have been computed and stored. Then, when the next set of input data samples are received at the hardware accelerator, the preprocessed data x_pre, which includes adapted DPD parameters, are generated by correlating the next input data samples for the input data signal x to the updated entries in the DPD LUT and performing multiplication and summation of the various delayed signal versions of the input signal x, as noted above. Again, the hard-computed terms may be optionally combined with the soft-computed terms provided by the processing array 502. This process may be iteratively repeated over time to dynamically adapt the DPD parameters. In the current illustrative scenario, the DPD entries in the LUT 'B' may be overwritten or otherwise modified with the updated DPD parameters. Then, for the next data transmissions, the entries in the LUT B may be accessed to provide the preprocessed data x_pre, until a further DPD adaptation is performed and the results written to the LUT A, and so on.

Turning now to FIG. 5B, the hybrid architecture 550 provides full flexibility to add terms and/or to modify the results of the set of terms computed by the hardware accelerator 506 using the PEs of the processing array 502. Thus, for the hybrid architecture 550 as shown in FIG. 5B, the initial data flow includes the computation of hard-computed DPD parameters via the hardware accelerator 506 as part of the initial data flow. The hard-computed DPD parameters are then transferred to the processing array 502 and subjected to further processing operations via the processing array 502 and/or the processor 501. Thus, in accordance with the hybrid architecture 550, the preprocessed data x_pre is computed by feeding back the hard-computed DPD parameters to the processing array 502 via the data interface 504, which are then further processed to compute a set of modified DPD parameters. The data interface 504 is configured in this architecture to transfer the initial set of processed data samples generated by the hardware accelerator 506, which includes the set of hard-computed terms, to one or more of the PEs in the processing array 502 as an array of data samples. The PEs of the processing array 502 and/or the processor 501 may then perform further computations on the array of data samples constituting the hard-computed terms to generate the set of modified DPD parameters, which may then be applied to the input data samples identified with the input signal x to generate the preprocessed data x_pre.

Therefore, the preprocessed data x_pre is already stored or otherwise known to the processing system (i.e. the processing array 502 and/or the processor 501), and thus does not need to be transferred back to the hardware accelerator 5065 for the hybrid architecture data flow as shown in FIG. 5B. As a result, the total bandwidth over the data interface 504 is equal for the two hybrid architectures 500, 500, although the hybrid architecture 550 provides more flexibility in augmenting and post-processing the DPD hard-computed results. In this way, not only is the hybrid architecture 550 capable of adding terms to those computed by the hardware accelerator 506, but the processing array 502 and/or the processor 501 may also perform additional data processing operations that may be needed. Such an architecture may be particularly useful for some linear or non-linear filtering of signals used in wireless data communications to improve performance. In another scenario, such a hybrid architecture may be particularly useful to perform IQ imbalance correction.

In any event, each of the hybrid architectures 500, 550 may output preprocessed data samples x_pre to a processing block 508 for further digital processing, as noted above. Moreover, for subsequent data transmission, the hardware accelerator 506 for each of the hybrid architectures 500, 550 may continue to access the LUT entries A or B to perform hardware-based DPD parameter computations using received data samples until updated DPD parameters have been computed and stored as the alternate LUT entries. Thus, the A and B LUT entries for both of the hybrid architectures 500, 500 may contain DPD parameters that have been recently updated via monitoring of the output data signal and additional computations performed via the processing array 502 and/or the processor 501. The decision regarding whether to perform the DPD adaptation process and thus provide updated DPD parameters to the (currently unused) LUT entries, which in turn triggers the hardware accelerator 506 to access the LUT with the updated DPD entries, may be based upon any suitable number and/or combination of conditions.

In one illustrative scenario, a timer may be used for this purpose, which may be monitored via the processor 501 and/or the processing array 502. The timer may be set to a predetermined time period such that, when the time period elapses, the DPD adaptation process is executed to sample the output data y, perform the DPD parameter calculations, and then update the entries of the unused LUT of the hardware accelerator 506 as discussed above. The predetermined time period may be static in nature or changed dynamically based upon a region of use, the particular frequencies of operation, data rates, etc. As another illustrative scenario, any suitable number and/or type of data statistics may be monitored via the processing array 502 and/or the processor 501 (or other suitable processors) to determine whether the DPD adaptation process should be triggered. This may include periodically or continuously monitoring the metrics mentioned above that are used to calculate the DPD parameters such as ACLR, EVM, or any other suitable metrics and comparing the measured metrics to predetermined threshold values. The data interface 504 may indicate to the hardware accelerator 506 which sets of LUT entries to use at any particular time using control signals, as further discussed below.

Figure 6A:
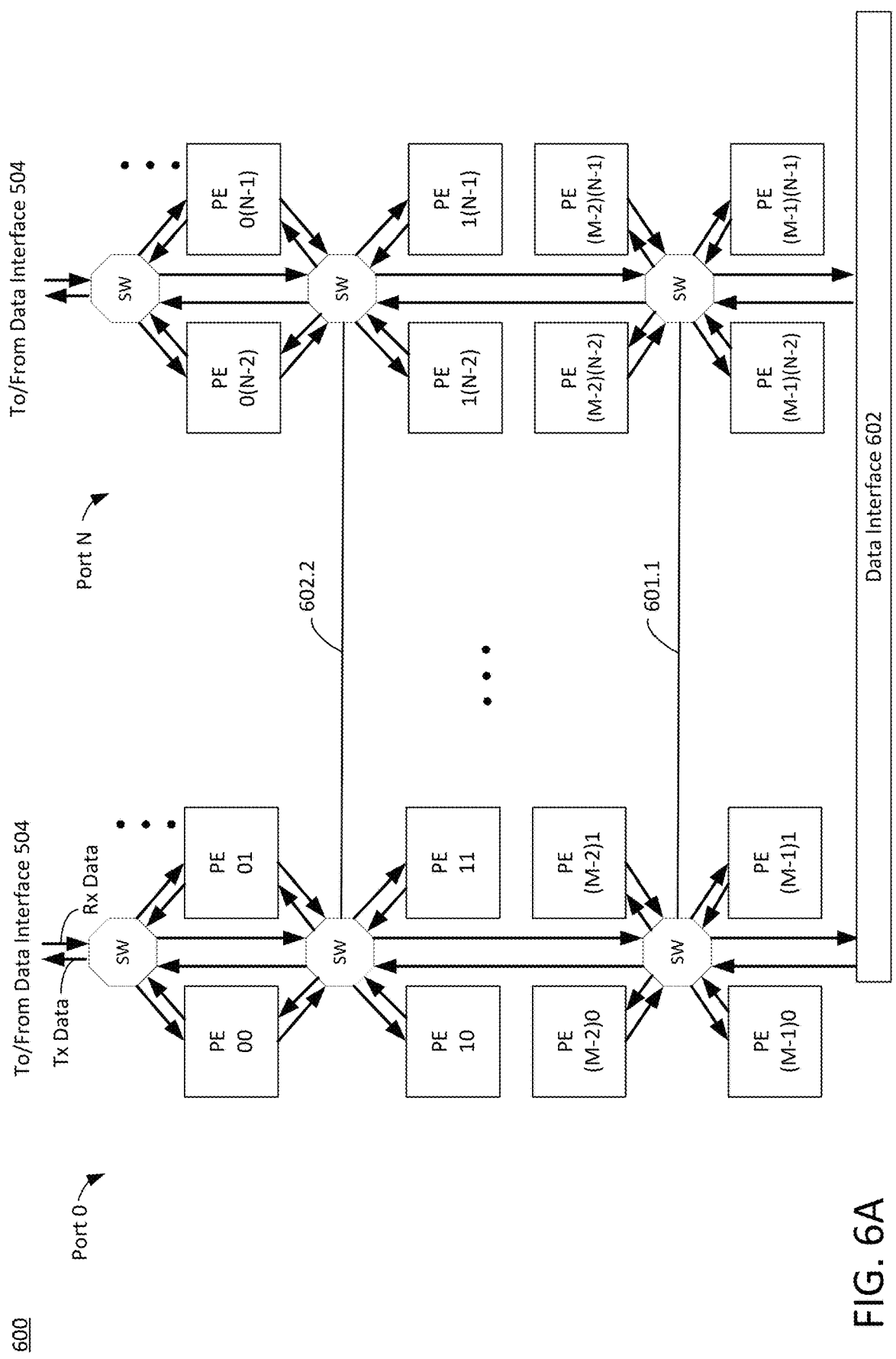
FIG. 6A illustrates a block diagram of a programmable processing array portion of a hybrid programmable processing array and hardware accelerator architecture, in accordance with the disclosure.

FIG. 6A illustrates a block diagram of a programmable processing array portion of a hybrid programmable processing array and hardware accelerator architecture, in accordance with the disclosure. The hybrid architecture portion 600 as shown in FIG. 6A further illustrates details of the processing array 502 as shown in FIGS. 5A and 5B. Thus, the processing array 502 may include any suitable number N of ports, with each port including any suitable number of processing elements (PEs), each of which may form part of the processing array architecture as noted above. Although each port is shown in FIG. 6A as including 8 PEs, this is for ease of explanation and brevity, and the processing array 502 may include any suitable number of such PEs per port. Thus, the processing array 502 may include a mesh of PEs, the number of which being equal to the number of PEs per port (M) multiplied by the total number of ports (N). Thus, for an illustrative scenario in which the processing array 502 includes 8 ports and 8 PEs per port, the processing array 502 would implement (M×N)=(8×8)=64 PEs. Each of the PEs in each respective port are coupled to a data interface 602 via a dedicated data bus.

The data bus as shown in FIG. 6A is adapted for use in a DFE used for wireless communications, and thus the dedicated bus includes a TX and an RX data bus in this non-limiting scenario. Moreover, in accordance with such a configuration, each port may be identified with a respective antenna that is used as part of a multiple-input multiple-output (MIMO) communication system. Thus, the number of antennas used in accordance with such systems may be equal to the number of ports N, with each port being dedicated to a data stream transmitted and received per antenna.

The data interface 602 may represent any suitable type of data interface that is configured to provide data to be transmitted onto the TX data bus and to receive data that has been received via the RX data bus. Thus, the data interface 602 may be implemented as any suitable type of data interface for this purpose, such as a standardized serial interface used by data converters (ADCs and DACs) and logic devices (FPGAs or ASICs), and which may include a JESD interface and/or a chip-to-chip (C2C) interface. In accordance with the present illustrative scenario in which the processing array 502 is implemented as part of a DFE, the data interface 602 may be coupled to the processor 501 and/or to a data modem to facilitate the transmission and reception of data samples in accordance with any suitable data rate and/or communication protocol. In accordance with conventional DFE applications that use hardwired solutions as noted herein, the data interface 602 may typically be coupled directly to such components. However, to provide the hybrid functionality as discussed herein to realize the benefits of both programmable and hardwired implementations, the hybrid architecture portion 600 includes the data interface 602 being coupled to the processing array 502, which is in turn coupled to the hardware accelerator 506 via the data interface 504, as discussed in further detail below.

Each of the PEs in each port of the processing array 502 may be coupled to the TX and the RX data bus, and each PE may perform processing operations on an array of data samples retrieved from the TX or the RX data bus as discussed herein. The access to the array of data samples included in the PEs may be facilitated by any suitable configuration of switches (SW), as denoted in FIG. 6A via the SW blocks. The switches within each of the ports of the processing array 502 may also be coupled to one another via interconnections 601, with two being shown in FIG. 6A for the illustrative scenario of each port including 8 PEs. Thus, the interconnections 601.1, 602.2 function to arbitrate the operation and corresponding data flow of each grouping of 4 PEs within each port that are respectively coupled to each local port switch. The flow of data to a particular grouping of PEs and a selection of a particular port may be performed in accordance with nay suitable techniques, including known techniques. In one illustrative scenario, this may be controlled via an SoC, system and/or global system clock of which the processing array 502, the data interface 504, and the hardware accelerator 506 form a part.

Thus, at any particular time one or more of the PEs may access an array of data samples provided on the TX data bus or the RX data bus to perform processing operations, with the results then being provided onto the respective TX or RX data bus. In other words, any number and combination of the PEs per port may sequentially or concurrently perform processing operations to provide an array of processed data samples to the TX data bus or the RX data bus. The decisions regarding which PEs perform the processing operations may be controlled via operation of the switches, which may include the use of control signals in accordance with any suitable techniques to do so, including known techniques. However, and as further discussed below, the data interface 504 functions to couple the processing array 502 to the hardware accelerator 506, and thus knowledge regarding which PE has provided the processed array of data samples and at what time is leveraged to facilitate the synchronization process between the processing array 502 and the hardware accelerator 506. As further discussed herein, this information may be known by the SoC, system, the processor 501, and/or global system clock of which the processing array 502, the data interface 504, and the hardware accelerator 506 form a part.

Figure 6B:
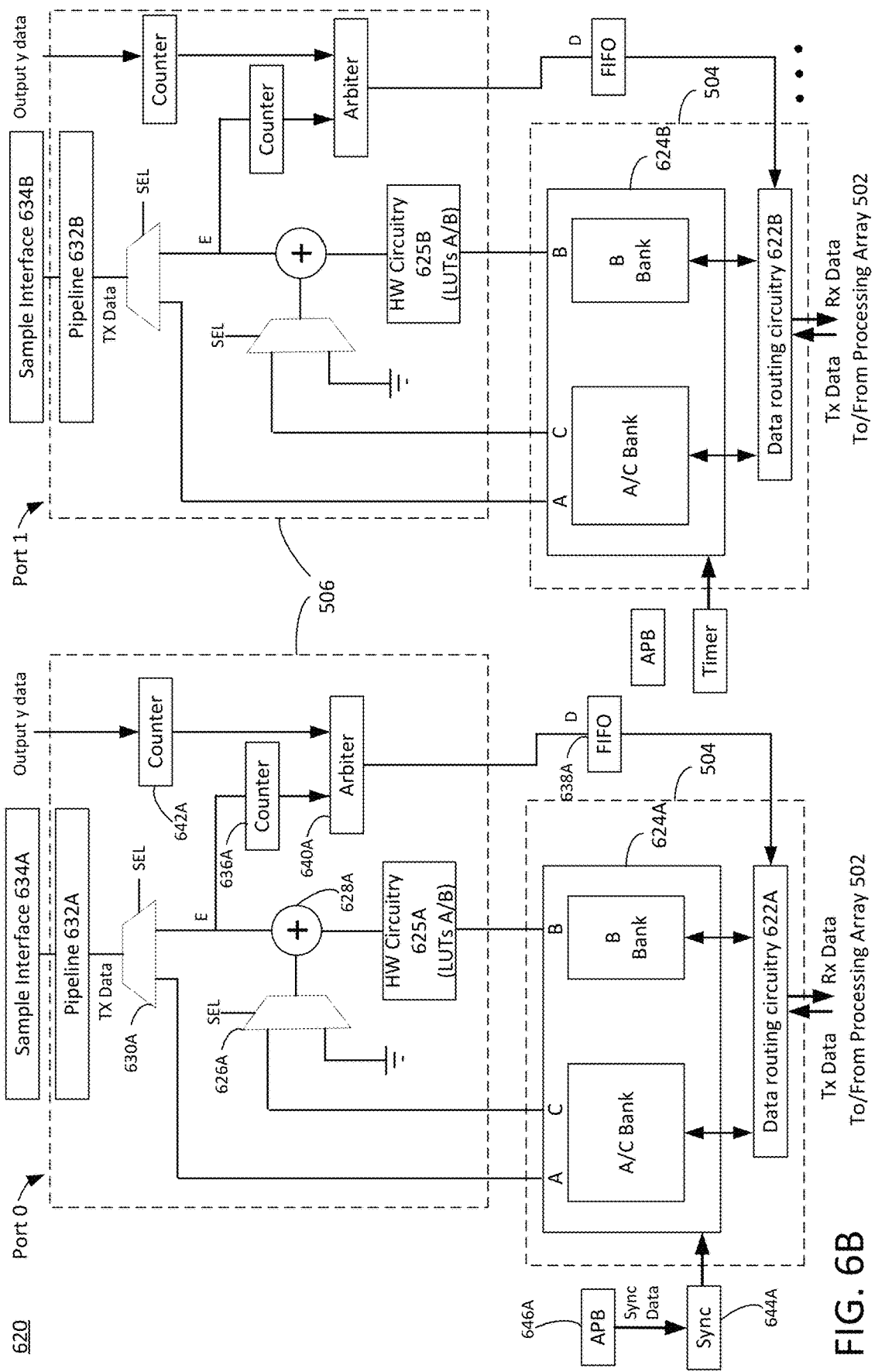
FIG. 6B illustrates a block diagram of a data interface and hardware accelerator portion of a hybrid programmable processing array and hardware accelerator architecture, in accordance with the disclosure.

FIG. 6B illustrates a block diagram of a data interface and hardware accelerator portion of a hybrid programmable processing array and hardware accelerator architecture, in accordance with the disclosure. Although the hybrid programmable processing array and hardware accelerator architecture may include any suitable number of N ports as discussed herein, two ports (port 0 and port 1) are shown in the Figures for purposes of brevity. Reference is made with respect to port 0 as shown in the Figures, although it will be understood that each port may have the same or identical configuration as port 0. As shown in FIG. 6B, the data interface 504 includes data routing circuitry 622A and a memory 624A (port 1 may have an identical configuration, with the suffixes A and B used to denote these different components among the different ports). In some scenarios as further discussed below, the hybrid architectures 500, 550 may implement any suitable number of ports, with a subset of such ports being configured to operate in a "ganging" configuration. In some scenarios, and as discussed in further detail below, such ganging implementations may combine two or more ports to operate in parallel with one another, such as port 0 and port 1 as shown in the Figures. In accordance with such implementations, two ports may work in parallel such that the hardware accelerators 506 identified with each respective port work in a chain configuration, thereby doubling the computational performance. As further discussed below, such implementations may still use a single DAC and antenna chain, although the computational performance of the hardware accelerators (and the number of LUTs when applicable) is doubled. Such ganging implementations may be particularly useful to increase functionality for performing DPD computations, as such computations are additive in nature.

Moreover, the data interface 504 and the hardware accelerator 506 as shown in FIG. 6B may be implemented to support both of the different hybrid architectures 500, 550 as shown in FIGS. 5A-5B. That is, although the different hybrid architectures 500, 550 as shown in FIGS. 5A-5B correspond to different respective data flows, the data interface 504 and the hardware accelerator 506 as shown in FIG. 6B may be dynamically reconfigured to support either of these data flows depending upon the particular application or other design considerations, as noted in further detail below.

To do so, the memory 624A may be implemented as any suitable type of memory of any suitable size depending upon the particular application. The memory 624A may represent any suitable type of storage such as volatile or a non-volatile memory, and which may have any suitable size, addressable space, and address configuration depending upon the size of the data samples that are loaded. The data in the memory 624A may be stored as arrays of data samples after processing operations have been performed by the PEs within each respective port, and thus the memory 624A may be partition, formatted, or otherwise organized in accordance with any suitable addressing scheme. The addressing scheme, size of data contained at each address, and/or the addressable range of the memory 624A is a function of the number of PEs per port, as well as the data array size used by the PEs of the processing array 502. In one scenario, the memory 624A may be implemented as having two or more data banks of memory, each data bank having a number of partitions equal to the number of PEs, such that arrays of data samples provided by each PE may be stored in the each respectively-assigned partition, as further discussed below. In various scenarios, the memory 624A may be sized to store any suitable number of data samples such as 16K, 32K, 64K, 128K, etc. The memory 624A may thus function as a data buffer to enable the hardware accelerator 506 to perform processing operations on the arrays of data samples transferred from the processing array 502.

Figure 6C:
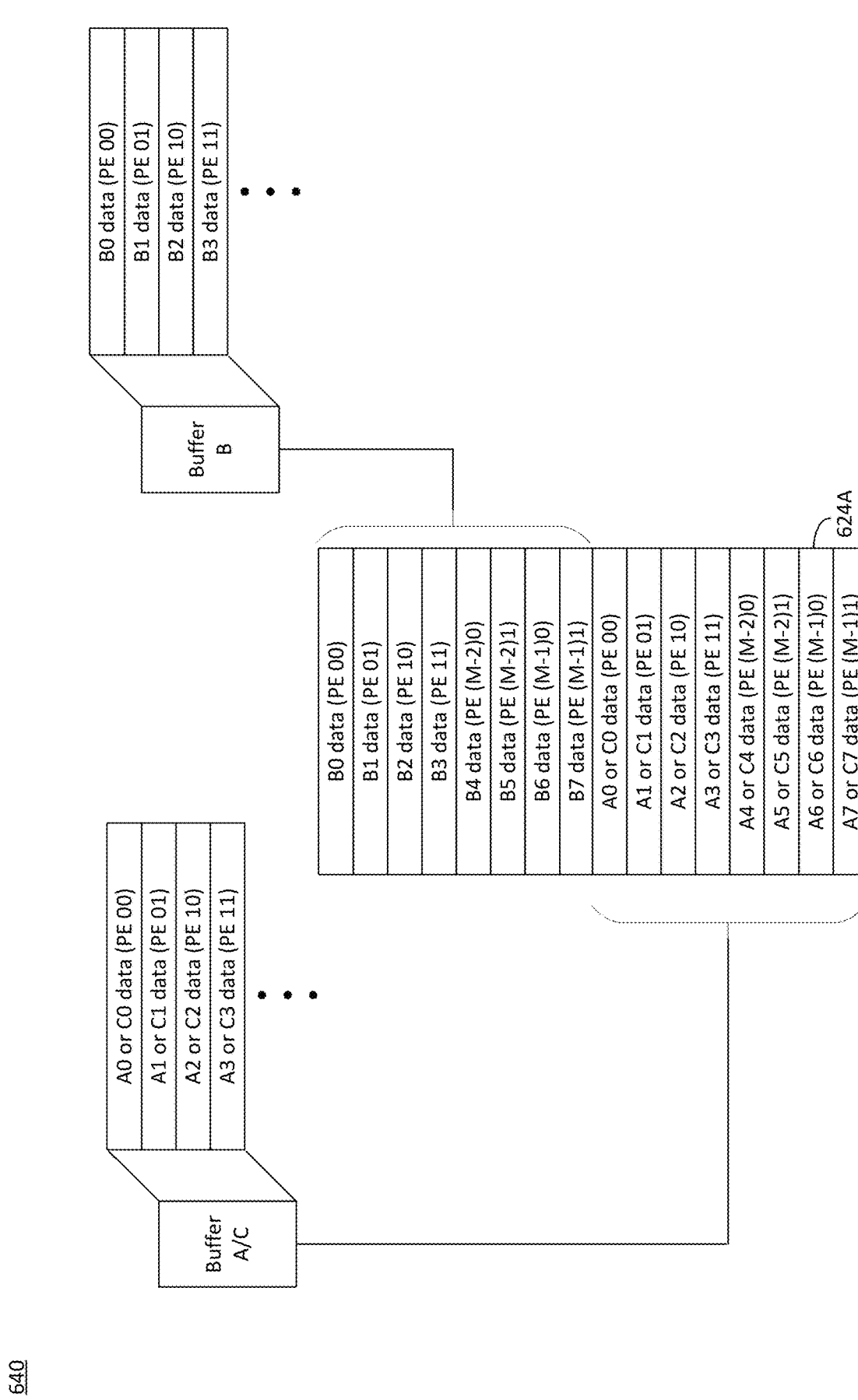
FIG. 6C illustrates a block diagram of a buffer used as part of the data interface of a hybrid programmable processing array and hardware accelerator architecture, in accordance with the disclosure.

In any event, the overall size of the memory 624A may be split into two data banks as shown in FIG. 6B, with each data bank being identified with data provided by the PEs of the processing array 602 in accordance with a particular data flow. Thus, in an illustrative scenario in which the memory 624A may be sized to store 32K data samples, the B data sample bank may store 16K samples, with a maximum of 2K samples being stored in each of eight respective partitions, with each partition being assigned to data provided by one of the 8 PEs as shown in FIG. 6C.

The other data bank may be shared between data referred to herein as an A data sample bank and a C data sample bank, with the contents of each data bank corresponding to the data flow identified with the different hybrid architectures 500, 550 as discussed above with reference to FIGS. 5A-5B. It is noted that although the memory 624A may include two data banks, the entire contents of the A/C data bank at any particular time is dedicated to one of the data flows as described herein with respect to the different hybrid architectures 500, 550. In particular, when the contents of the A/C data bank is identified with the 'C' data flow, the hardware accelerator 506 is configured to operate in accordance with the hybrid architecture 500 as shown in FIG. 5A. However, when the contents of the A/C data bank is identified with the 'A' data flow, the hardware accelerator 506 is configured to operate in accordance with the hybrid architecture 550 as shown in FIG. 5B.

In other words, the A/C data bank may be partitioned in an identical manner as the B data bank, although the contents of the A/C data bank depends upon the particular operating mode of the hardware accelerator 506. The B data bank, however, is dedicated to the "initial" data flow as noted above and shown in FIGS. 5A-5B, and thus the contents of the B data bank are used in accordance with the initial transfer of the array of data samples from the PEs of the processing array 502, which applies to both of the hybrid architectures 500, 550. It is also noted that the partitions in each of the A/C and B data banks need not be equal to one another as illustrated in FIG. 6C. That is, the PE-specific address partitions in each of the A/C and B data banks may be of any suitable size, and may be the same as one another or different than one another, and may differ within the same data bank. To provide an illustrative scenario, the B0 and B1 addresses range in the B data bank may be configured to store 4K samples each, with the B2-B3 addresses storing 2K samples each, and the B4-B7 addresses storing 1K samples each. The A/C data bank may be of the same size or a different size than the B data bank, and may include partitions having the same or different addressable configurations as one another and/or the B data bank.

In any event, the data routing circuitry 622A is configured to transfer the array of data samples from the PEs of the processing array 502 to the hardware accelerator 506 by writing each array of data samples to a predetermined range of addresses in the data memory 624A based upon which one of the PEs provided (i.e. output or generated) the array of data samples. In other words, the data routing circuitry 622A functions to identify, for each array of data samples received via the data interface 502, the corresponding PE that generated that array of data samples (i.e. PE00, PE01, PE10, PE11 . . . PE(MN), etc.). To do so, each PE may include any suitable type of identifier, which may be encoded bits, which function to identify the PE that generated the array of data samples, and may additionally encode the type of data samples that are being generated in accordance with the operating mode of the hardware accelerator. The data routing circuitry 622A may be implemented as any suitable number and/or type of processors, processing circuitry, executable instructions, a microcontroller, etc., that is configured to recognize this predetermined encoded information and, in response, store the array of data samples in the corresponding address in the memory 624A. The data routing circuitry 622A may be identified with the processor 501.

Therefore, regardless of whether the hardware accelerator 506 is configured to operate in accordance with the hybrid architecture 500 as shown in FIG. 5A or the hybrid architecture 550 as shown in FIG. 5B, the data routing circuitry 622A stores the initial data flow of each array of data samples in the B data bank of the memory 624A. The hardware accelerator 506 then accesses this range of addresses from the memory 624A as shown in FIG. 6C based upon the array of data samples to be used for a hardware computation in accordance with each particular PE. The hardware accelerator 506 uses the array of data samples accessed from the corresponding address range of the B data bank to perform the hard-computed DPD parameter computations in accordance with a predetermined processing function by correlating the array of data samples to the entries stored in the LUTs identified with the HW circuitry 625A, as discussed above.

However, the subsequent data flow may change depending upon the operating mode of the hardware accelerator 506. It is noted that the flow of data within the hardware accelerator 506 is controlled via the various logic components as shown in FIG. 6B, which may be controlled or otherwise arbitrated the processor 501, the SoC, system, and/or global system clock of which the processing array 502, data interface 504, and hardware accelerator 506 form a part. This may include a device that implements the hybrid architectures 500, 550, as discussed in further detail below with respect to FIG. 8. Such a device may also function to control the data routing circuitry 622A as noted above to ensure that the data arrays are stored in the corresponding addresses of the memory 624.

To provide an illustrative scenario, for the hybrid architecture 500 as shown in FIG. 5A, one or more of the PEs may perform processing operations on another array of data samples to generate an array of processed data samples, which may again include a set of additional soft-computed DPD parameters, as noted above. In this configuration, the data routing circuitry 622A stores the array of processed data samples including the set of soft-computed DPD parameters in the portion of the memory 624A identified with the C data bank, with the array of processed data samples being stored in a partition of address ranges of the C data bank as shown in FIG. 6C that correlates to each respective "source" PE, i.e. the PE that generated the array of processed data samples. A logic level of a select (SEL) control of a mux 626A is then set such that the summation circuitry 628A receives the array of data samples stored in the C bank of the memory 624A, which includes the soft-computed DPD parameters, which are then added to the hard-computed DPD parameters output by the LUTs 525 as shown in FIG. 6B. The result is that the initial hard-computed DPD parameters (computed via the hardware accelerator 506) are added to the soft-computed DPD parameters (computed via the processing array 502), which is represented as the data flow E in FIG. 5B.

The data samples for the B data bank and the A/C data bank may be synchronized via the data routing circuitry 622A using the synchronization circuitry 644A. In other words, the data stored in the C data bank may be provided from a different PE than the data stored in the B data bank, i.e. the data stored in the C data bank may be provided with a delay compared to the data stored in the B data bank, and thus the data stored in the B and C data banks are synchronized. In this way, the synchronization circuitry 644A functions to synchronize the hard-computed DPD parameters computed via the hardware accelerator 506 by mapping the stored B data bank samples in to the LUT entries with the additional soft-computed DPD parameters stored as C data in the A/C data bank (as well as performing multiplication and summing as noted herein). The synchronization circuitry 644A may be implemented as part of and/or controlled via the processor 501 or any suitable combination of hardware and/or software components. In one illustrative scenario, the synchronization circuitry 644A may be implemented as any suitable type of timer. Regardless of the particular implementation, the synchronization circuitry 644A may receive synchronization data from the processor 501, the SoC, system, and/or global system clock of which the processing array 502 and hardware accelerator 506 form a part. This may include a separate or integrated microcontroller implemented for the purpose of monitoring and/or arbitrating the data flow of the data samples between the hardware accelerator 506 and the processing array 502. The synchronization data may be provided in this way using knowledge of the when each PE generated the array of data samples, as well as the instructions used to generate the initial hard computed terms and the new soft-computer terms. The synchronization circuitry 644A may receive the synchronization data from any suitable source and in accordance with any suitable communication protocol. In one scenario, the synchronization data may be provided via an Advanced Peripheral Bus (APB) interface 646A via a suitable system component of which the processing array 502, data interface 504, and hardware accelerator 506 form a part. In any event, the synchronization circuitry 644A is configured to provide any suitable trigger control signals to delay the start of data processing of data samples stored in the B data bank by the hardware accelerator 506 until the array of data samples have been stored in the C data bank, thereby ensuring synchronization of the processing of the data samples stored in the B and C data banks. It is also noted that the synchronization circuitry 644A may ensure synchronization of data samples in this way by compensating for any suitable number and/or type of system delays. This may include delays introduced by the hardware accelerator 506, which may include processing time, time to perform computations in accordance with the LUTs identified with the HW circuitry 625A, etc. Such delays may be known a priori, measured, and/or adapted to the known and/or measured system properties. Thus, the synchronization circuitry 644A may function to provide a delay that may be dynamically adjusted or predetermined, in various implementations. In this way, it is ensured that the data samples are properly synchronized (which may include time alignment) for the summation circuitry 628A adding to be properly performed.

Figure 6D:
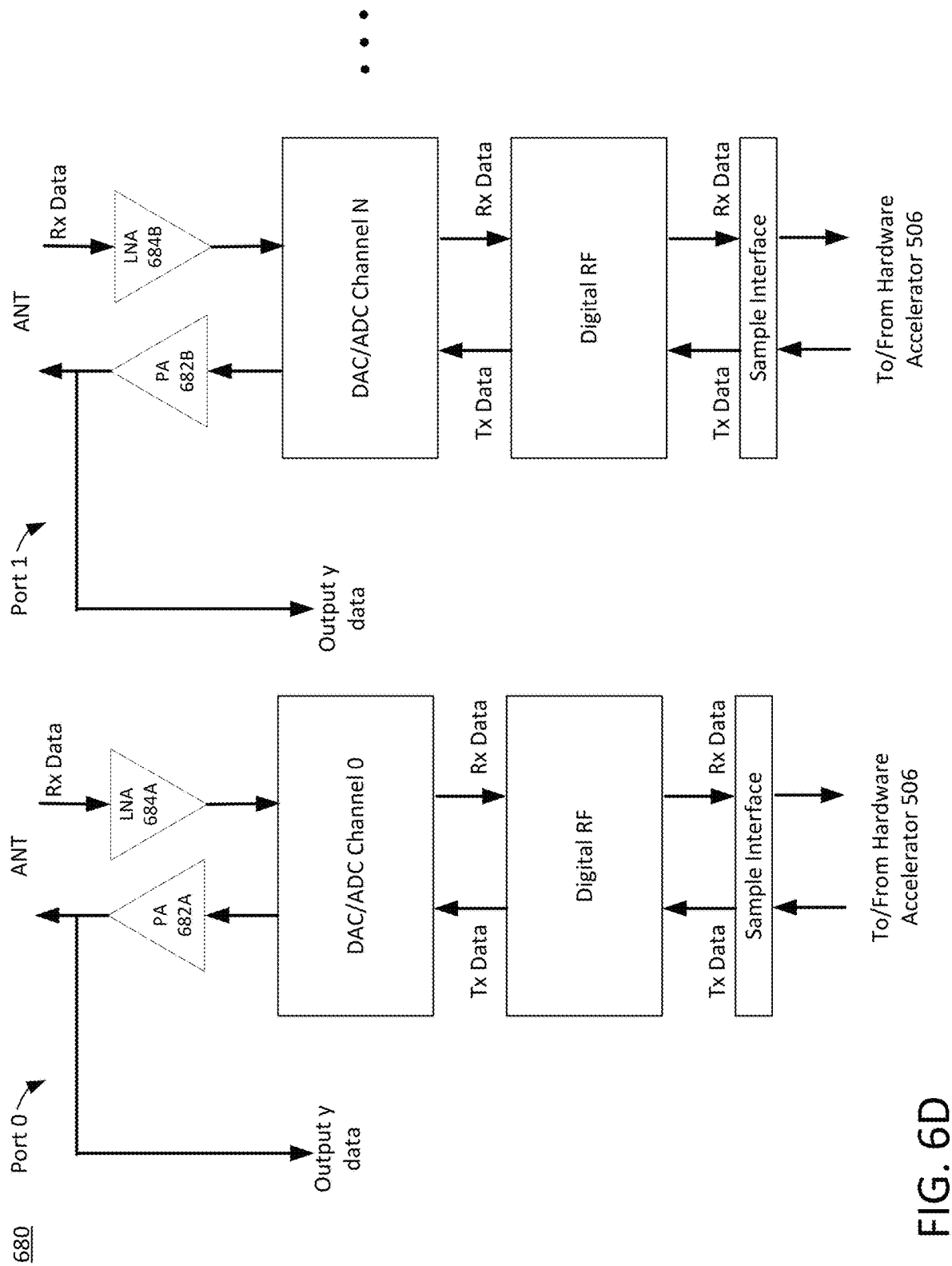
FIG. 6D illustrates a block diagram of an RF front end used as part of a hybrid programmable processing array and hardware accelerator architecture, in accordance with the disclosure.

Once the combined hard- and soft-computed DPD parameters are summed together via the summation circuitry 628A to generate the preprocessed data x_pre, the logic level of the select (SEL) control of the mux 630A is then set such that the preprocessed data x_pre is provided to the sample interface 634A. The data pipeline 632A and the sample interface 634A may be implemented as any suitable combination of hardware components, software components, and/or processing circuitry to regulate the flow of data to another component in accordance with the particular application. In one scenario, the preprocessed data x_pre, which includes the computed DPD parameters applied to the input data signal x, is coupled via the data pipeline 632A and the sample interface 634A to a corresponding digital front end as shown in FIG. 6D, which includes the conversion of the digital data samples to an analog data signal that is amplified via the PA 682A for transmission via a coupled antenna in accordance with any suitable wireless communication protocol.

The output data signal y is then sampled from the output of the PA 682A and converted to digital data samples via an ADC (not shown). The sampled output data y is transferred back to the processing array 502 so that the DPD parameters may be modified and the corresponding entries (A/B) of the LUTs identified with the HW circuitry 625A modified as needed, as discussed above with respect to FIG. 5A and the hybrid architecture 500. To do so, the sampled output data y is fed through a counter 642A and an arbiter 640 to a FIFO buffer 638A, which is then accessed via the data routing circuitry 622A and transferred to the processing array 502. The counter 642A functions to track an address index of the output data samples y in this way, which is used to increment the address in which the data samples are stored in the FIFO buffer 638A as represented by the data flow D. The data samples stored in the FIFO 638A may thus represent an array of data samples corresponding to the sampled output data y. The arbiter 640 may be configured as any suitable type of switch, data router, etc. to control the data provided to the FIFO buffer 638A, which may alternatively store and/or route data output via the summation circuitry 628A depending upon the stage within the data flow. The output data samples y, i.e. the data samples, are then provided to the data routing circuitry 622A as an N-bit word value in accordance with the corresponding size of the array of data samples used by the PEs. The data routing circuitry 622A may thus utilize knowledge of the index tracked by the counter 642A to retrieve the array of data samples from the corresponding address in the FIFO buffer 638A, which are then transferred back to one or more of the PEs as an array of data samples.

As another illustrative scenario, for the hybrid architecture 550 as shown in FIG. 5B, the data interface 504 is configured to transfer the processed data samples including the set of hard-computed DPD parameters from the output of the HW circuitry block 625A to the one of the of the PEs of the processing array 502 as an array of data samples. To do so, a logic level of the select (SEL) control of the mux 626A is set such that the summation circuitry 628A does not receive the array of data samples stored in the C bank of the memory 624A, but instead receives 0 (GND) data values that are added to the hard-computed DPD parameters such that the values of the hard-computed DPD parameters output via the HW circuitry block 625A are not affected. As noted above for the output data samples y, the hard-computed DPD parameters, i.e. the data samples, are then provided to the data routing circuitry 622A as an N-bit word value in accordance with the corresponding size of the array of data samples used by the PEs. The counter 636A functions to track an address index of the hard-computed data samples in this way, which is used to increment the address in which the data samples are then stored in the FIFO buffer 638A as represented by the data flow D. The data samples stored in the FIFO 638A may thus represent an array of data samples corresponding to the hard-computed DPD parameters. Again, the arbiter 640 is configured as a switch to control the data provided to the FIFO buffer 638A, which may alternatively store the output y data samples as discussed herein. The data routing circuitry 622A may thus utilize knowledge of the index tracked by the counter 636A to retrieve the array of data samples from the corresponding address in the FIFO buffer 638A, which is then transferred back to one or more of the PEs as an array of data samples.

As noted above for FIG. 5B, the one or more PEs may then perform one or more processing operations on the array of data samples transferred via the data interface 504 to compute updated DPD parameters and generate the preprocessed data x_pre. The data routing circuitry 622A may then transfer this array of data samples to the A data bank of the memory 624A, again storing the preprocessed data x_pre in the memory 624A as data samples at address locations that correspond to those PEs that generated the array of data samples. The synchronization circuitry 644A may again trigger the array of data samples being read from the A data bank of the memory 624A. Then, a logic level of the select (SEL) control of the mux 630A is set such that the preprocessed data x_pre stored in the A data bank of the memory 624A are provided to the data pipeline 632A and the sample interface 634A.

Once provided in this manner, the preprocessed data x_pre is converted to an analog signal via the ADC as shown in FIG. 6D, amplified via the PA 682A, and transmitted via the corresponding antenna as noted above for the data flow of the hybrid architecture 500 as shown in FIG. 5A. As was the case for the hybrid architecture 500, the hybrid architecture 550 in this scenario likewise samples the output data signal y output of the PA 682A, which is converted to digital data samples via an ADC (not shown). The sampled output data y is then transferred back to the processing array 502 so that the DPD parameters may be adapted (i.e. modified) and the corresponding entries (A/B) of the LUTs identified with the HW circuitry 625A modified as needed, as discussed above.

Again, for the data flows implemented via each of the hybrid architectures 500, 500 as noted herein, the processor 501 and/or the processing circuitry 502 may then utilize the sampled output data y to dynamically adapt the DPD parameter computations and then update the corresponding LUT entries in the LUT identified with the HW circuitry 625A. This process may iteratively continue such that the hardware accelerator 506 applies the corresponding LUT entries corresponding to the most recently-updated DPD parameters. To do so, the data routing circuitry 622A may provide a suitable control signal to the hardware accelerator 506 (not shown) that enables the hardware accelerator 506 to identify which LUT entries are to be used for any incoming set of data samples to perform hardware-based computations. The control signal may be implemented in some scenarios, as a digital logic control signal, with one logic level denoting one set of LUT entries corresponding to one set of DPD parameters and the other logic level denoting a separate set of LUT entries for another set of DPD parameters. In this way, the hardware accelerator 506 provides hard-computed DPD parameters that match those that are computed by the processing array 502 using the sampled output data y. As noted above, the switch from current to updated or adapted DPD parameters in this way may be triggered based upon any suitable conditions.

Figure 7:
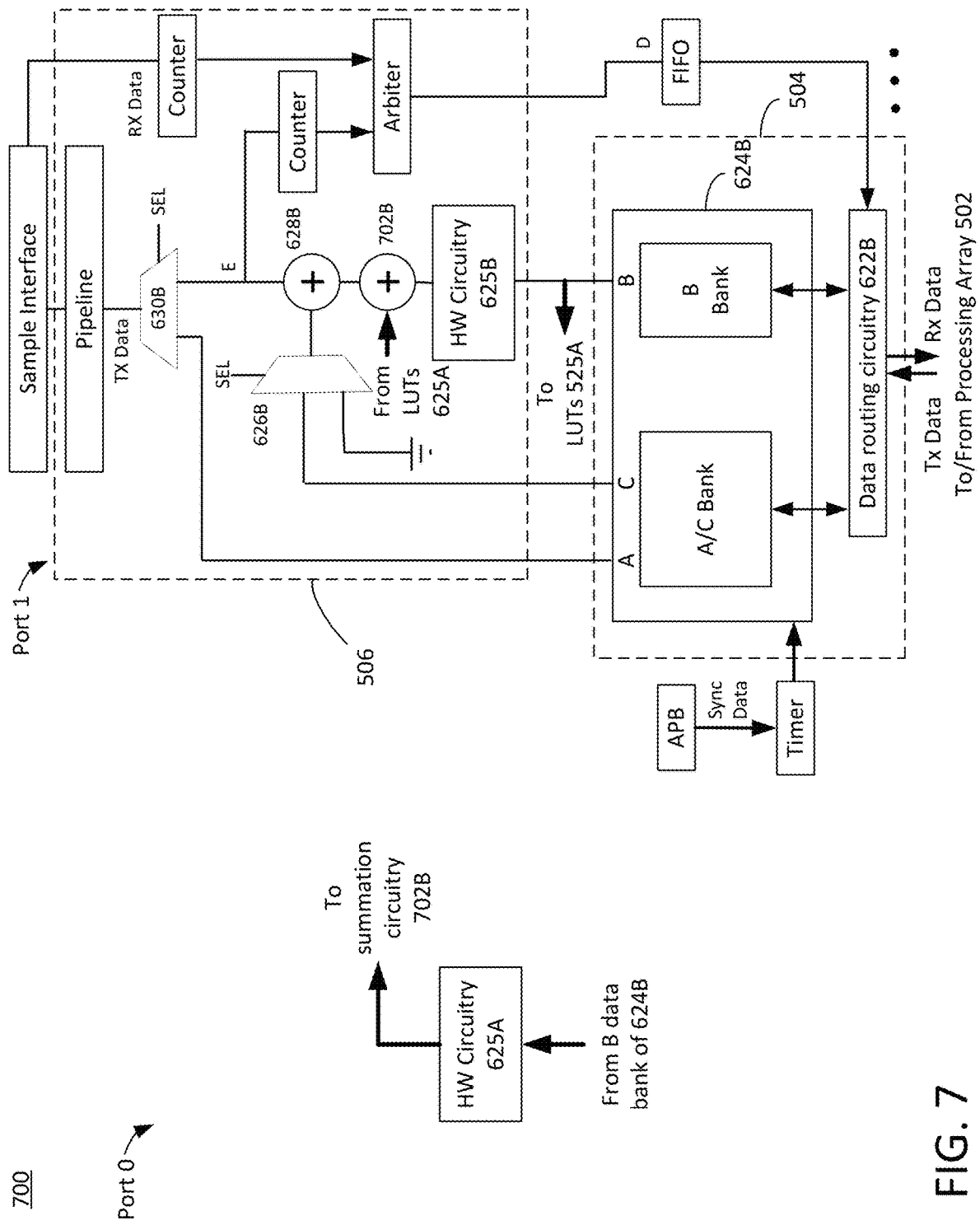
FIG. 7 illustrates a block diagram of a ganging configuration data flow, in accordance with the disclosure.

FIG. 7 illustrates a block diagram of a ganging configuration data flow, in accordance with the disclosure. As noted above, two ports (or more) of the hybrid architectures 500, 550 may work in parallel with one another. This parallel configuration of two or more ports may be referred to herein as a "ganging" implementation. The ganging implementation as shown in FIG. 7 may optionally be implemented in accordance with the hybrid architectures 500, 550 as shown in FIGS. 5A-5B. To do so, one or more of the hardware accelerators 506 identified with a respective port of the hybrid architecture 500, 550 may implement an additional summation circuitry 702B, which is coupled to the output of the HW circuitry 625 of each respective hardware accelerator 506 configured in this manner. In the illustrative scenario as shown in FIG. 7, the summation circuitry 702B is coupled to the output of the HW circuitry 625A (identified with the hardware accelerator 506 of port 0) and the HW circuitry 625B (identified with the hardware accelerator 506 of port 1). Thus, in this configuration, ports 0 and 1 operate in a ganging configuration. Although not shown in the Figures for purposes of brevity, any suitable number of the hardware accelerators 506, each being identified with a separate port, may implement the summation circuitry 702 in accordance with any suitable number and/or type of switches, arbiters, routing circuitry, etc., such that the summation circuitry 602 may be optionally used when the hardware accelerator 506 is operating in the ganging implementation, and otherwise remain unused.

In any event, the hardware accelerator 506 identified with each of the ports 0 and 1, respectively, is fed data accessed from the B data bank that has been stored via the data routing circuitry 622B, which in this scenario is identified with the initial data flow as discussed herein. Thus, this initial data flow B is the same for the ganging implementations used in accordance with either of the hybrid architectures 500, 550. In each case, each hardware accelerator 506 then uses the array of data samples accessed from the corresponding address range of the B data bank to compute terms in accordance with a predetermined processing function by correlating the array of data samples to the entries stored in the LUTs identified with the HW circuitry 625A and 625B, as discussed above. This generates two separate sets of terms, one per each hardware accelerator 506 identified with each respective port. These separate sets of terms are then added together via the summation circuitry 702B and output to the summation circuitry 628B. Thus, the initial B data flow in the ganging implementation corresponds to a sum of terms computed via the two separate hardware accelerators 506, i.e. the hardware accelerator 506 identified with each of the ports 0 and 1.

The remainder of the data flow that follows for this ganging implementation is similar to that described above with reference to FIG. 6B, and depends upon the particular hybrid architecture that is implemented. For the hybrid architecture 500 as shown in FIG. 5A, the data samples are accessed from the C data bank, which have processed by the processing array 502 and stored in the C data bank via the data routing circuitry 622B and include additional soft-computed terms. These soft-computed terms are further summed with the hard-computed terms that have been summed via the summation circuitry 702B. Again, this is implemented via the control of the mux 626B via the use of any suitable control signal for the SEL line. The SEL line of the mux 630B is further set to output the data samples, which include the soft-computed terms that are have been added to the hard-computed and summed terms, to the pipeline and sample interface for data transmission, as noted above.

For the hybrid architecture 550 as shown in FIG. 5B, the hard-computed terms that are summed via the summation circuitry 702B are fed back to the processing array 502 for further processing. Again, this is implemented via the use of the mux 626B with the control signal for the SEL line such that the summation circuitry 628B does not add further terms to the summed hard-computed terms. The counter, arbiter, and FIFO buffer as shown in FIG. 7 function in the same manner as described above with reference to FIG. 6B, such that the data routing circuitry 622B transfers the summed hard-computed terms output via the summation circuitry 628B to the PEs of the processing array 502, which may perform or more processing operations to generate soft-computed modified terms. Again, these soft-computed modified terms may then be transferred to the A data bank of the buffer 624B as discussed above for data transmission. That is, the resulting soft-computed modified terms may be output to the pipeline and sample interface in the same manner as discussed above for the ganging implementation in accordance with the hybrid architecture 500 by controlling the SEL line of the mux 630B, as noted above. Thus, for both the non-ganging and the ganging implementations, the hybrid architecture 550 may implement a feedback path via the output of the summation circuitry 628, the counter 636, the arbiter 640, and the FIFO buffer 638, which facilitates the transfer of the hard-computed (or the summed hard-computed terms in the case of the ganging implementations) back to the processing array 502 via the data routing circuitry 622. In any event, the hard-computed or the summed hard-computed terms, as the case may be, are fed back in this way to enable the hybrid architecture 550 to dynamically adjust the pre-distorted data output to the pipeline 632 and to the sample interface 634 for transmission.

In this way, for both hybrid configurations 500, 550, the hardware accelerators 506 identified with each respective port work in a parallel with one another, thereby doubling the computational performance. Such implementations still use the DAC and antenna as shown in FIG. 6D for port 1 in this scenario. And because the summation circuitry 702 enables the combination of terms from two separate hardware accelerators 506, such implementations are particularly advantageous when the number of terms needs to be increased beyond what would otherwise be available via the use of a single hardware accelerator 506.

Device Implementing a Hybrid Programmable Processing Array and Hardware Accelerator Architecture Again, the hybrid architectures 500, 550 may be implemented as part of or work in conjunction with a specialized component such as a radio transceiver that implements digital signal processing to perform various operations that may be utilized as part of wireless signal processing applications associated with wireless data communications. Thus, and with respect to the processing operations performed via the processing array portion and the hardware accelerator portion as discussed herein, these operations may be any suitable type of function that operates on the data samples. For the hardware accelerator portion, this may include the computation of any suitable number and/or type of terms using dedicated, predetermined hardware such as LUTs as noted above. The processing operations and computations performed on the data samples, as well as the number and/or type of terms computed in this manner, are a function of the particular application in which the hybrid architectures 400, 450 are utilized.

Again, such processing operations may include digital signal processing operations that are associated with wireless data communications, the application and/or calculation of finite impulse response (FIR) filter contributions to a digital data stream, equalizer functions, the calculation of digital pre-distortion (DPD) parameters, the application or calculation of Fast Fourier Transforms (FFTs) and/or digital Fourier Transforms (DFTs), matrix operations, mixer and/or frequency correction calculations, peak detection and/or cancellation calculations, signal measurements, average signal measurement calculations over time, digital signal processing of signals transmitted or received via individual antenna data streams for multiple-input-multiple-output (MIMO) antenna systems, etc. Furthermore, the data samples as discussed herein may be part of an in-phase (I) quadrature-phase (Q) data stream, which may be processed prior to data transmission of wireless signals or after receiving the wireless signals. Additionally or alternatively, such functions may be implemented as part of graphics processing unit (GPU) to perform graphics processing and/or rendering.

Figure 8:
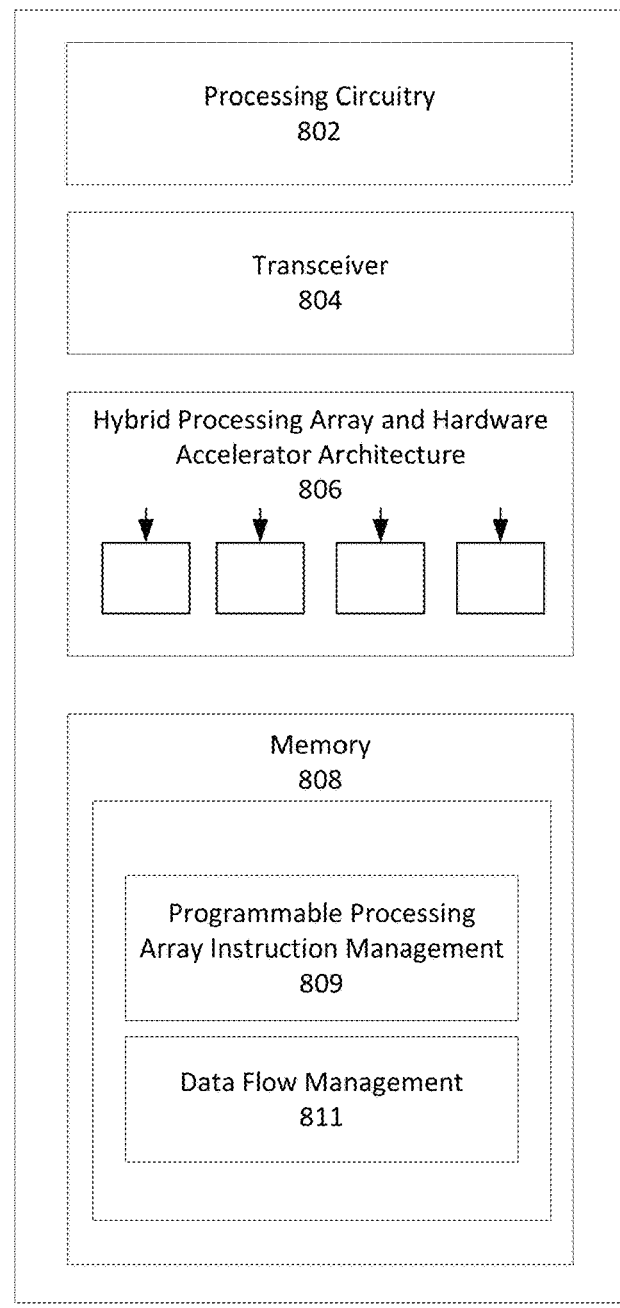
FIG. 8 illustrates an example device, in accordance with the disclosure.

FIG. 8 illustrates an example device, in accordance with the present disclosure. The device 800 may be identified with one or more devices implementing a hybrid programmable processing array and hardware accelerator architecture, such as the hybrid architectures 500, 550 as shown and discussed herein with reference to FIGS. 5A-5B. The device 800 may be identified with a wireless device, a user equipment (UE) or other suitable device configured to perform wireless communications such as a mobile phone, a laptop computer, a wireless communications base station, a tablet, etc., and which may include one or more components configured to transmit and receive radio signals and to use processing operations as discussed herein to perform digital signal processing operations in accordance with wirelessly transmitted and/or received data, which may include filter processing, DFE processing, etc. Alternatively, the device 800 may be identified with a graphics processing unit (GPU), which may perform graphic processing on streams of graphical data.

As further discussed below, the device 800 may perform the functions as discussed herein with respect to the hybrid programmable processing array and hardware accelerator architectures 500, 550 as shown and discussed with respect to FIGS. 5A and 5B. The device 800 may calculate soft and hard computed DPD parameters on arrays of data samples as discussed herein. To do so, the device 800 may include processing circuitry 802, a transceiver 804, a hybrid processing array and hardware accelerator architecture 806, and a memory 808. The components shown in FIG. 8 are provided for ease of explanation, and the device 800 may implement additional, less, or alternative components as those shown in FIG. 8. In one scenario, the transceiver 804 may be omitted when not necessary for a particular application.

The processing circuitry 802 may be configured as any suitable number and/or type of processing circuitry and/or computer processors, which may function to control the device 800 and/or other components of the device 800. The processing circuitry 802 may be identified with one or more processors (or suitable portions thereof) implemented by the device 800 or a host system that implements the hybrid processing array and hardware accelerator architecture 806. The processing circuitry 802 may be identified with the processor 501 as discussed herein and/or with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of device 800 to perform various functions as described herein. The processing circuitry 802 may include one or more microprocessor cores, memory registers, buffers, clocks, etc., and may generate electronic control signals associated with the components of the device 800 to control and/or modify the operation of these components. The processing circuitry 802 may communicate with and/or control functions associated with the transceiver 84, the hybrid processing array and hardware accelerator architecture 806, and/or the memory 808.

The transceiver 804 (when present) may be implemented as any suitable number and/or type of components configured to transmit and/or receive data (such as data packets) and/or wireless signals in accordance with any suitable number and/or type of communication protocols. The transceiver 804 may include any suitable type of components to facilitate this functionality, including components associated with known transceiver, transmitter, and/or receiver operation, configurations, and implementations. Although depicted in FIG. 8 as a transceiver, the transceiver 804 may include any suitable number of transmitters, receivers, or combinations of these that may be integrated into a single transceiver or as multiple transceivers or transceiver modules. The transceiver 804 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 704 may be configured as any suitable number and/or type of components configured to facilitate receiving and/or transmitting data and/or signals in accordance with one or more communication protocols.

The transceiver 804 may be implemented as any suitable number and/or type of components to support wireless communications, and may be identified with the components as shown and discussed herein with reference to FIGS. 5A-5B and 6D. This may include analog-to-digital converters (ADCs), digital to analog converters (DACs), intermediate frequency (IF) amplifiers and/or filters, modulators, demodulators, baseband processors, one or more sample interfaces, one or more components otherwise known to be identified with RF front ends, such as DFEs, etc. The data received via the transceiver 804 (e.g. wireless signal data streams), data provided to the transceiver 804 for transmission (e.g. data streams for transmission), and/or data used in conjunction with the transmission and/or reception of data via the transceiver 804 (digital filter coefficients, DPD parameters, etc.) may be processed as data streams via the hybrid processing array and hardware accelerator architecture 806, as discussed herein. Thus, the hybrid processing array and hardware accelerator architecture 806 may be identified with the hybrid architectures 500, 550 as shown and described herein with reference to FIGS. 5A-5B, which is shown in further detail in FIGS. 6A-6C.

The memory 808 stores data and/or instructions such that, when the instructions are executed by the processing circuitry 802, cause the device 800 to perform various functions as described herein with respect to the hybrid processing array and hardware accelerator architecture 806, such as controlling, monitoring, and/or regulating the flow of data through the hybrid processing array and hardware accelerator architecture 806. The memory 808 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 808 may be non-removable, removable, or a combination of both. The memory 808 may be implemented as a non-transitory computer readable medium storing one or more executable instructions such as, for example, logic, algorithms, code, etc.

As further discussed below, the instructions, logic, code, etc., stored in the memory 808 are represented by the various modules as shown, which may enable the functionality disclosed herein to be functionally realized. Alternatively, the modules as shown in FIG. 8 that are associated with the memory 808 may include instructions and/or code to facilitate control and/or monitor the operation of hardware components implemented via the device 800. In other words, the modules shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein.

The executable instructions stored in the programmable processing array instruction management module 809 may facilitate, in conjunction with execution via the processing circuitry 802, the device 800 receiving and decoding processor instructions (which may be sent via the processing circuitry 802 or other suitable component of the device 800 or a component external to the device 800), and providing arrays of data samples to the PEs within the processing array portion of the hybrid processing array and hardware accelerator architecture 806 (such as via the data interface 602 as discussed herein). The functionality provided by the programmable processing array instruction management module 809 is a function of the particular implementation and/or type of processing array implemented via the device 800.

Thus, if a vector processor is implemented, then the programmable processing array instruction management module 809 may facilitate the determination of each specific vector processor instruction to perform specific types of vector processing operations and/or any of the functionality with respect to a vector processor architecture such as the retrieval of vector data samples from vector registers, performing vector processing operations and/or computations, providing the results of vector processing operations to the hardware accelerator portion of the hybrid processing array and hardware accelerator architecture 806, etc. Of course, in the event that the device 800 implements an FPGA, DSP, or other suitable type of processing array architecture, then the programmable processing array instruction management module 809 may function to translate and/or decode instructions to identify the type of processing operations and/or calculations to perform on arrays of data samples in an analogous manner as the use of a vector processor.

The executable instructions stored in the data flow management module 811 may facilitate, in conjunction with execution via the processing circuitry 802, the routing of data samples within the hybrid processing array and hardware accelerator architecture 806. This may include routing soft and/or hard computed DPD parameters as noted herein. With reference to FIGS. 6A-6D, this may include routing data from the data interface 602 to one or more PEs of the processing array 502 of the hybrid processing array and hardware accelerator architecture 806. This may additionally include routing arrays of data samples after processing operations have been performed via the PEs of the processing array 502 to the hardware accelerator 506 of the hybrid processing array and hardware accelerator architecture 806.

Thus, the executable instructions stored in the data flow management module 811 may facilitate routing data samples from the processing array 502 to the hardware accelerator 506 via the data interface 504 as shown and discussed herein with reference to FIGS. 6A-6D. This may include the control of the select lines of the muxes 626A, 630A, the synchronization of data samples via the synchronization circuitry 644, the storage of data samples in the corresponding address within the memory 624A, the identification of trigger conditions to update the DPD parameters store in the LUTs of the hardware accelerator 560, providing control signals to the hardware accelerator 506 to identify which set of LUT entries to use for DPD parameter computations, etc. This may further include routing data from the hardware accelerator 506 back to the processing array 502 via the data interface 504, which again may include the use of counters 640, 642 to identify the corresponding location of data in the FIFO 638A and the particular PEs of the processing array 502 to access the results of the data samples stored in the FIFO 638A as noted herein. This may also include routing the sampled output data y from the output of the PAs to the processing array 502 as noted above.

General Operation of a Hybrid Processing Array and Hardware Accelerator Architecture A system on a chip (SoC) is provided. With reference to FIGS. 5A-5B, the SoC includes an array of processing elements, each one of the processing elements being configured to perform processing operations on an array of data samples corresponding to an input data signal; a hardware accelerator; and a data interface coupled to the array of processing elements and to the hardware accelerator, the data interface being configured to transfer the array of data samples from the array of processing elements to the hardware accelerator, the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters. One of the array of processing elements is configured to compute additional DPD parameters, and the data interface is configured to synchronize the additional DPD parameters computed via the one of the array of processing elements with the DPD parameters computed via the hardware accelerator. In addition or in alternative to and in any combination with the optional features previously explained in this paragraph, the hardware accelerator comprises summation circuitry configured to add the DPD parameters and the additional DPD parameters to provide a set of combined DPD parameters. In addition or in alternative to and in any combination with the optional features previously explained in this paragraph, the set of preprocessed data samples are generated by applying the set of combined DPD parameters to the array of data samples corresponding to the input data signal. In addition or in alternative to and in any combination with the optional features previously explained in this paragraph, the data interface is configured to transfer a set of output data samples corresponding to the output data signal to one of the array of processing elements, and the one of the array of processing elements is configured to adapt the DPD parameters by computing modified DPD parameters using the set of output data samples. In addition or in alternative to and in any combination with the optional features previously explained in this paragraph, the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters. In addition or in alternative to and in any combination with the optional features previously explained in this paragraph, the hardware accelerator is configured to compute the DPD parameters or the modified computed DPD parameters by correlating the array of data samples transferred via the data interface to one of the first or the second one of the two different sets of data entries, respectively, in response to a control signal received via the data interface. In addition or in alternative to and in any combination with the optional features previously explained in this paragraph, the hardware accelerator comprises a set of lookup tables (LUTs), each one of the set of LUTs containing data entries corresponding to the computed DPD parameters, and the hardware accelerator is configured to compute the DPD parameters in accordance with the predetermined preprocessing function by correlating the array of data samples transferred via the data interface to the data entries in the set of LUTs. In addition or in alternative to and in any combination with the optional features previously explained in this paragraph, the data interface is configured to transfer a set of DPD parameter data samples corresponding to the computed DPD parameters computed via the hardware accelerator to one of the array of processing elements, and the one of the array of processing elements is configured to generate the set of preprocessed data samples by computing a first set of modified DPD parameters using the DPD parameters, and applying the first set of modified DPD parameters to the array of data samples corresponding to the input data signal. In addition or in alternative to and in any combination with the optional features previously explained in this paragraph, the data interface is configured to transfer a set of output data samples corresponding to the output data signal to one of the array of processing elements, and the one of the array of processing elements is configured to adapt the first set of modified DPD parameters by computing a second set of modified DPD parameters using the set of output data samples. In addition or in alternative to and in any combination with the optional features previously explained in this paragraph, the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters. In addition or in alternative to and in any combination with the optional features previously explained in this paragraph, the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

General Configuration of a Wireless Device

A wireless device is provided. With reference to FIG. 8, the wireless device includes an array of processing elements, each one of the processing elements being configured to perform processing operations on an array of data samples corresponding to an input data signal; a hardware accelerator; and a data interface coupled to the array of processing elements and to the hardware accelerator, the data interface being configured to transfer the array of data samples from the array of processing elements to the hardware accelerator, the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters. One of the array of processing elements is configured to compute additional DPD parameters, and the data interface is configured to synchronize the additional DPD parameters computed via the one of the array of processing elements with the DPD parameters computed via the hardware accelerator. In addition or in alternative to and in any combination with the optional features previously explained in this paragraph, the hardware accelerator comprises summation circuitry configured to add the DPD parameters and the additional DPD parameters to provide a set of combined DPD parameters. In addition or in alternative to and in any combination with the optional features previously explained in this paragraph, the set of preprocessed data samples are generated by applying the set of combined DPD parameters to the array of data samples corresponding to the input data signal. In addition or in alternative to and in any combination with the optional features previously explained in this paragraph, the data interface is configured to transfer a set of output data samples corresponding to the output data signal to one of the array of processing elements, and the one of the array of processing elements is configured to adapt the DPD parameters by computing modified DPD parameters using the set of output data samples. In addition or in alternative to and in any combination with the optional features previously explained in this paragraph, the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters. In addition or in alternative to and in any combination with the optional features previously explained in this paragraph, the hardware accelerator is configured to compute the DPD parameters or the modified computed DPD parameters by correlating the array of data samples transferred via the data interface to one of the first or the second one of the two different sets of data entries, respectively, in response to a control signal received via the data interface. In addition or in alternative to and in any combination with the optional features previously explained in this paragraph, the hardware accelerator comprises a set of lookup tables (LUTs), each one of the set of LUTs containing data entries corresponding to the computed DPD parameters, and the hardware accelerator is configured to compute the DPD parameters in accordance with the predetermined preprocessing function by correlating the array of data samples transferred via the data interface to the data entries in the set of LUTs. In addition or in alternative to and in any combination with the optional features previously explained in this paragraph, the data interface is configured to transfer a set of DPD parameter data samples corresponding to the computed DPD parameters computed via the hardware accelerator to one of the array of processing elements, and the one of the array of processing elements is configured to generate the set of preprocessed data samples by computing a first set of modified DPD parameters using the DPD parameters, and applying the first set of modified DPD parameters to the array of data samples corresponding to the input data signal. In addition or in alternative to and in any combination with the optional features previously explained in this paragraph, the data interface is configured to transfer a set of output data samples corresponding to the output data signal to one of the array of processing elements, and the one of the array of processing elements is configured to adapt the first set of modified DPD parameters by computing a second set of modified DPD parameters using the set of output data samples. In addition or in alternative to and in any combination with the optional features previously explained in this paragraph, the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters. In addition or in alternative to and in any combination with the optional features previously explained in this paragraph, the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

Process Flow

Figure 9:
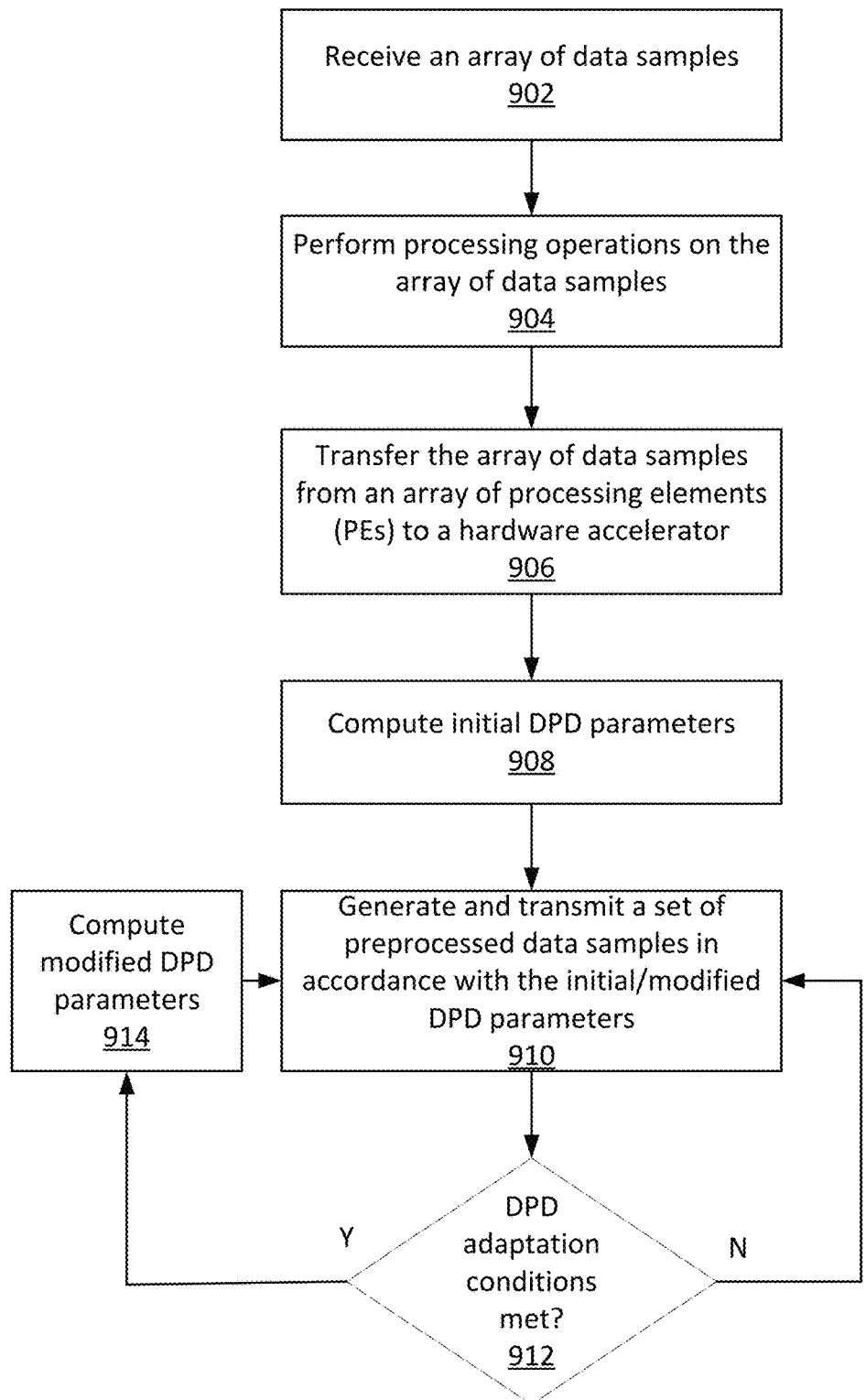
FIG. 9 illustrates a process flow, in accordance with the disclosure.

FIG. 9 illustrates a process flow. With reference to FIG. 9, the process flow 900 may be a computer-implemented method executed by and/or otherwise associated with one or more processors (processing circuitry) and/or storage devices. These processors and/or storage devices may be associated with one or more components of the hybrid architectures 500, 550 as discussed herein and/or one or more components of the device 800 as discussed herein. The processors and/or storage devices may be identified with the one or more PEs of the processing array 502, the processor 501, processing circuitry identified with the hardware accelerator 806, and/or the processing circuitry 802. The flow 900 may include alternate or additional steps that are not shown in FIG. 9 for purposes of brevity, and may be performed in a different order than the steps shown in FIG. 9.

Flow 900 may begin when one or more processors receive (block 902) an array of data samples. These data samples may be provided via the data interface 602 as discussed above with reference to FIGS. 6A-6D, and include any suitable number of data samples as discussed herein.

Flow 900 may include one or more processors, in response to receiving the array of data samples, performing (block 904) processing operations on the array of data samples. These processing operations may be executed via the PEs of the processing array 502 as noted above in accordance with specific instructions such as an instruction set. The processing operations may include reordering, reformatting, reorganizing, and/or modifying the array of data samples, as noted herein.

Flow 900 may include one or more processors transferring (block 906) the array of data samples after the processing operations have been performed from the array of PEs of the processing array 502 to the hardware accelerator 506. This may include the use of the data interface 504 to write the data samples, once processed, to the corresponding address of a buffer identified with the memory 624A, as noted above.

Flow 900 may include one or more processors computing (block 908) initial DPD parameters using a predetermined processing function using the transferred array of data samples. This may include the hardware accelerator 506 correlating the array of processed data samples to LUT entries as noted herein to provide hard-computed DPD parameters. Again, depending upon the particular architecture and data flow application that is implemented, the initially computed DPD parameters may represent a combination of hard and soft-computed DPD parameters, as discussed with reference to the architecture 500 as shown in FIG. 5A. Alternatively, the initially computed DPD parameters may represent soft-computed DPD parameters that are computed via the processing array 502 using the initial set of DPD parameters fed back from the hardware accelerator 506, as discussed with reference to the architecture 550 as shown in FIG. 5B.

Flow 900 may include one or more processors generating and transmitting (block 910) a set of preprocessed data samples x_pre in accordance with the initial DPD parameters. This may include the generation of the preprocessed data x_pre via the hardware accelerator, as discussed with reference to the architecture 500 as shown in FIG. 5A. Alternatively, the preprocessed data x_pre may be generated via the processing array 502, as discussed with reference to the architecture 550 as shown in FIG. 5B. This block may also include the conversion of the data samples identified with the preprocessed data x_pre to an analog signal, and amplification of the analog signal via a PA for transmission via a coupled antenna as discussed herein.

Flow 900 may include one or more processors determining (block 912) whether one or more DPD adaptation conditions have been met. Again, this may include one or more of the various trigger conditions as noted above, such as the expiration of a timer, comparing various measured metrics mentioned such as ACLR, EVM, etc. to predetermined threshold values, etc.

If so, then the flow 900 may include one or more processors computing modified DPD parameters. This may include sampling the output signal y as discussed herein, with the digital samples thereof being fed back to the processing array 502 as noted above. The processor 501 and/or the processing array may then compute adapted DPD parameters in accordance with any suitable type of DPD function. The processor 501 and/or the processing array may then overwrite one of the sets of LUT entries identified with the hardware accelerator 506 such that the process may continue (blocks 910, 912) using the modified DPD parameters as noted above.

If not, then the process may continue (blocks 910, 912) using the current or initial set of DPD parameters stored in the LUTs of the hardware accelerator 506. The process flow may repeated (i.e. iteratively be repeated) for any suitable number of input data samples over time such that the DPD parameters are dynamically and continuously updated in this manner.

EXAMPLES

The following examples pertain to various techniques of the present disclosure.

An example (e.g. example 1) relates to a system on a chip (SoC). The SoC includes an array of processing elements, each one of the processing elements being configured to perform processing operations on an array of data samples corresponding to an input data signal; a hardware accelerator; and a data interface coupled to the array of processing elements and to the hardware accelerator, the data interface being configured to transfer the array of data samples from the array of processing elements to the hardware accelerator, wherein the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters.

Another example (e.g. example 2) relates to a previously-described example (e.g. example 1), wherein: one of the array of processing elements is configured to compute additional DPD parameters, and the data interface is configured to synchronize the additional DPD parameters computed via the one of the array of processing elements with the DPD parameters computed via the hardware accelerator.

Another example (e.g. example 3) relates to a previously-described example (e.g. one or more of examples 1-2), wherein the hardware accelerator comprises summation circuitry configured to add the DPD parameters and the additional DPD parameters to provide a set of combined DPD parameters.

Another example (e.g. example 4) relates to a previously-described example (e.g. one or more of examples 1-3), wherein the set of preprocessed data samples are generated by applying the set of combined DPD parameters to the array of data samples corresponding to the input data signal.

Another example (e.g. example 5) relates to a previously-described example (e.g. one or more of examples 1-4), wherein: the data interface is configured to transfer a set of output data samples corresponding to the output data signal to one of the array of processing elements, and the one of the array of processing elements is configured to adapt the DPD parameters by computing modified DPD parameters using the set of output data samples.

Another example (e.g. example 6) relates to a previously-described example (e.g. one or more of examples 1-5), wherein: the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters.

Another example (e.g. example 7) relates to a previously-described example (e.g. one or more of examples 1-6), wherein the hardware accelerator is configured to compute the DPD parameters or the modified computed DPD parameters by correlating the array of data samples transferred via the data interface to one of the first or the second one of the two different sets of data entries, respectively, in response to a control signal received via the data interface.

Another example (e.g. example 8) relates to a previously-described example (e.g. one or more of examples 1-7), wherein the hardware accelerator comprises a set of lookup tables (LUTs), each one of the set of LUTs containing data entries corresponding to the computed DPD parameters, and wherein the hardware accelerator is configured to compute the DPD parameters in accordance with the predetermined preprocessing function by correlating the array of data samples transferred via the data interface to the data entries in the set of LUTs.

Another example (e.g. example 9) relates to a previously-described example (e.g. one or more of examples 1-8), wherein: the data interface is configured to transfer a set of DPD parameter data samples corresponding to the computed DPD parameters computed via the hardware accelerator to one of the array of processing elements, and the one of the array of processing elements is configured to generate the set of preprocessed data samples by computing a first set of modified DPD parameters using the DPD parameters, and applying the first set of modified DPD parameters to the array of data samples corresponding to the input data signal.

Another example (e.g. example 10) relates to a previously-described example (e.g. one or more of examples 1-9), wherein: the data interface is configured to transfer a set of output data samples corresponding to the output data signal to one of the array of processing elements, and the one of the array of processing elements is configured to adapt the first set of modified DPD parameters by computing a second set of modified DPD parameters using the set of output data samples.

Another example (e.g. example 11) relates to a previously-described example (e.g. one or more of examples 1-10), wherein: the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters.

Another example (e.g. example 12) relates to a previously-described example (e.g. one or more of examples 1-11), wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

An example (e.g. example 13) relates to a wireless device. The wireless device includes an array of processing elements, each one of the processing elements being configured to perform processing operations on an array of data samples corresponding to an input data signal; a hardware accelerator; and a data interface coupled to the array of processing elements and to the hardware accelerator, the data interface being configured to transfer the array of data samples from the array of processing elements to the hardware accelerator, wherein the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters.

Another example (e.g. example 14) relates to a previously-described example (e.g. example 13), wherein: one of the array of processing elements is configured to compute additional DPD parameters, and the data interface is configured to synchronize the additional DPD parameters computed via the one of the array of processing elements with the DPD parameters computed via the hardware accelerator.

Another example (e.g. example 15) relates to a previously-described example (e.g. one or more of examples 13-14), wherein the hardware accelerator comprises summation circuitry configured to add the DPD parameters and the additional DPD parameters to provide a set of combined DPD parameters.

Another example (e.g. example 16) relates to a previously-described example (e.g. one or more of examples 13-15), wherein the set of preprocessed data samples are generated by applying the set of combined DPD parameters to the array of data samples corresponding to the input data signal.

Another example (e.g. example 17) relates to a previously-described example (e.g. one or more of examples 13-16), wherein: the data interface is configured to transfer a set of output data samples corresponding to the output data signal to one of the array of processing elements, and the one of the array of processing elements is configured to adapt the DPD parameters by computing modified DPD parameters using the set of output data samples.

Another example (e.g. example 18) relates to a previously-described example (e.g. one or more of examples 13-17), wherein: the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters.

Another example (e.g. example 19) relates to a previously-described example (e.g. one or more of examples 13-18), wherein the hardware accelerator is configured to compute the DPD parameters or the modified computed DPD parameters by correlating the array of data samples transferred via the data interface to one of the first or the second one of the two different sets of data entries, respectively, in response to a control signal received via the data interface.

Another example (e.g. example 20) relates to a previously-described example (e.g. one or more of examples 13-19), wherein the hardware accelerator comprises a set of lookup tables (LUTs), each one of the set of LUTs containing data entries corresponding to the computed DPD parameters, and wherein the hardware accelerator is configured to compute the DPD parameters in accordance with the predetermined preprocessing function by correlating the array of data samples transferred via the data interface to the data entries in the set of LUTs.

Another example (e.g. example 21) relates to a previously-described example (e.g. one or more of examples 13-20), wherein: the data interface is configured to transfer a set of DPD parameter data samples corresponding to the computed DPD parameters computed via the hardware accelerator to one of the array of processing elements, and the one of the array of processing elements is configured to generate the set of preprocessed data samples by computing a first set of modified DPD parameters using the DPD parameters, and applying the first set of modified DPD parameters to the array of data samples corresponding to the input data signal.

Another example (e.g. example 22) relates to a previously-described example (e.g. one or more of examples 13-21), wherein: the data interface is configured to transfer a set of output data samples corresponding to the output data signal to one of the array of processing elements, and the one of the array of processing elements is configured to adapt the first set of modified DPD parameters by computing a second set of modified DPD parameters using the set of output data samples.

Another example (e.g. example 23) relates to a previously-described example (e.g. one or more of examples 13-22), wherein: the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters.

Another example (e.g. example 24) relates to a previously-described example (e.g. one or more of examples 13-23), wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

An example (e.g. example 25) relates to a system on a chip (SoC). The SoC includes an array of processing means, each one of the processing means being configured to perform processing operations on an array of data samples corresponding to an input data signal; a hardware accelerator; and a data interface coupled to the array of processing means and to the hardware accelerator, the data interface being configured to transfer the array of data samples from the array of processing means to the hardware accelerator, wherein the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters.

Another example (e.g. example 26) relates to a previously-described example (e.g. example 25), wherein: one of the array of processing means is configured to compute additional DPD parameters, and the data interface is configured to synchronize the additional DPD parameters computed via the one of the array of processing means with the DPD parameters computed via the hardware accelerator.

Another example (e.g. example 27) relates to a previously-described example (e.g. one or more of examples 25-26), wherein the hardware accelerator comprises summation circuitry configured to add the DPD parameters and the additional DPD parameters to provide a set of combined DPD parameters.

Another example (e.g. example 28) relates to a previously-described example (e.g. one or more of examples 25-27), wherein the set of preprocessed data samples are generated by applying the set of combined DPD parameters to the array of data samples corresponding to the input data signal.

Another example (e.g. example 29) relates to a previously-described example (e.g. one or more of examples 25-28), wherein: the data interface is configured to transfer a set of output data samples corresponding to the output data signal to one of the array of processing means, and the one of the array of processing means is configured to adapt the DPD parameters by computing modified DPD parameters using the set of output data samples.

Another example (e.g. example 30) relates to a previously-described example (e.g. one or more of examples 25-29), wherein: the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters.

Another example (e.g. example 31) relates to a previously-described example (e.g. one or more of examples 25-30), wherein the hardware accelerator is configured to compute the DPD parameters or the modified computed DPD parameters by correlating the array of data samples transferred via the data interface to one of the first or the second one of the two different sets of data entries, respectively, in response to a control signal received via the data interface.

Another example (e.g. example 32) relates to a previously-described example (e.g. one or more of examples 25-31), wherein the hardware accelerator comprises a set of lookup tables (LUTs), each one of the set of LUTs containing data entries corresponding to the computed DPD parameters, and wherein the hardware accelerator is configured to compute the DPD parameters in accordance with the predetermined preprocessing function by correlating the array of data samples transferred via the data interface to the data entries in the set of LUTs.

Another example (e.g. example 33) relates to a previously-described example (e.g. one or more of examples 25-32), wherein: the data interface is configured to transfer a set of DPD parameter data samples corresponding to the computed DPD parameters computed via the hardware accelerator to one of the array of processing means, and the one of the array of processing means is configured to generate the set of preprocessed data samples by computing a first set of modified DPD parameters using the DPD parameters, and applying the first set of modified DPD parameters to the array of data samples corresponding to the input data signal.

Another example (e.g. example 34) relates to a previously-described example (e.g. one or more of examples 25-33), wherein: the data interface is configured to transfer a set of output data samples corresponding to the output data signal to one of the array of processing means, and the one of the array of processing means is configured to adapt the first set of modified DPD parameters by computing a second set of modified DPD parameters using the set of output data samples.

Another example (e.g. example 35) relates to a previously-described example (e.g. one or more of examples 25-34), wherein: the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters.

Another example (e.g. example 36) relates to a previously-described example (e.g. one or more of examples 25-35), wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

An example (e.g. example 37) relates to a wireless device. The wireless device includes an array of processing means, each one of the processing means being configured to perform processing operations on an array of data samples corresponding to an input data signal; a hardware accelerator; and a data interface coupled to the array of processing means and to the hardware accelerator, the data interface being configured to transfer the array of data samples from the array of processing means to the hardware accelerator, wherein the hardware accelerator is configured to compute digital pre-distortion (DPD) parameters in accordance with a predetermined preprocessing function using the array of data samples transferred via the data interface; and a power amplifier (PA) configured to transmit an output data signal based upon a set of preprocessed data samples that are generated using the computed DPD parameters.

Another example (e.g. example 38) relates to a previously-described example (e.g. example 37), wherein: one of the array of processing means computes additional DPD parameters, and the data interface is configured to synchronize the additional DPD parameters computed via the one of the array of processing means with the DPD parameters computed via the hardware accelerator.

Another example (e.g. example 39) relates to a previously-described example (e.g. one or more of examples 37-38), wherein the hardware accelerator comprises summation circuitry configured to add the DPD parameters and the additional DPD parameters to provide a set of combined DPD parameters.

Another example (e.g. example 40) relates to a previously-described example (e.g. one or more of examples 37-39), wherein the set of preprocessed data samples are generated by applying the set of combined DPD parameters to the array of data samples corresponding to the input data signal.

Another example (e.g. example 41) relates to a previously-described example (e.g. one or more of examples 37-40), wherein: the data interface is configured to transfer a set of output data samples corresponding to the output data signal to one of the array of processing means, and the one of the array of processing means is configured to adapt the DPD parameters by computing modified DPD parameters using the set of output data samples.

Another example (e.g. example 42) relates to a previously-described example (e.g. one or more of examples 37-41), wherein: the hardware accelerator comprises a set of lookup tables (LUTs), each one of the set of LUTs containing two different sets of data entries, a first one of the two different sets of data entries corresponds to the DPD parameters, and a second one of the two different sets of data entries corresponds to the modified DPD parameters.

Another example (e.g. example 43) relates to a previously-described example (e.g. one or more of examples 37-42), wherein the hardware accelerator is configured to compute the DPD parameters or the modified computed DPD parameters by correlating the array of data samples transferred via the data interface to one of the first or the second one of the two different sets of data entries, respectively, in response to a control signal received via the data interface.

Another example (e.g. example 44) relates to a previously-described example (e.g. one or more of examples 37-43), wherein the hardware accelerator comprises a set of lookup tables (LUTs), each one of the set of LUTs containing data entries corresponding to the computed DPD parameters, and wherein the hardware accelerator is configured to compute the DPD parameters in accordance with the predetermined preprocessing function by correlating the array of data samples transferred via the data interface to the data entries in the set of LUTs.

Another example (e.g. example 45) relates to a previously-described example (e.g. one or more of examples 37-44), wherein: the data interface is configured to transfer a set of DPD parameter data samples corresponding to the computed DPD parameters computed via the hardware accelerator to one of the array of processing means, and the one of the array of processing means is configured to generate the set of preprocessed data samples by computing a first set of modified DPD parameters using the DPD parameters, and applying the first set of modified DPD parameters to the array of data samples corresponding to the input data signal.

Another example (e.g. example 46) relates to a previously-described example (e.g. one or more of examples 37-45), wherein: the data interface is configured to transfer a set of output data samples corresponding to the output data signal to one of the array of processing elements, and the one of the array of processing means is configured to adapt the first set of modified DPD parameters by computing a second set of modified DPD parameters using the set of output data samples.

Another example (e.g. example 47) relates to a previously-described example (e.g. one or more of examples 37-46), wherein: the hardware accelerator comprises a set of lookup tables (LUTs), each one of the set of LUTs containing two different sets of data entries, a first one of the two different sets of data entries corresponds to the first set of modified DPD parameters, and a second one of the two different sets of data entries corresponds to the second set of modified DPD parameters.

Another example (e.g. example 48) relates to a previously-described example (e.g. one or more of examples 37-47), wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM).

The memory can be non-removable, removable, or a combination of both.

What is claimed is:

1. A system on a chip (SoC), comprising:
an array of processing elements, each one of the processing elements being configured to perform processing operations on an array of data samples corresponding to an input data signal;
a hardware accelerator; and
a data interface coupled to the array of processing elements and to the hardware accelerator, the data interface being configured to transfer the array of data samples from the array of processing elements to the hardware accelerator,
wherein the hardware accelerator is configured to compute digital pre-distortion (DPD) parameters in accordance with a predetermined preprocessing function using the array of data samples transferred via the data interface; and
a power amplifier (PA) configured to transmit an output data signal based upon a set of preprocessed data samples that are generated using the DPD parameters.

2. The SoC of claim 1, wherein:
one of the array of processing elements is configured to compute additional DPD parameters, and
the data interface is configured to synchronize the additional DPD parameters computed via the one of the array of processing elements with the DPD parameters computed via the hardware accelerator.

3. The SoC of claim 2, wherein the hardware accelerator comprises summation circuitry configured to add the DPD parameters and the additional DPD parameters to provide a set of combined DPD parameters.

4. The SoC of claim 3, wherein the set of preprocessed data samples are generated by applying the set of combined DPD parameters to the array of data samples corresponding to the input data signal.

5. The SoC of claim 2, wherein:
the data interface is configured to transfer a set of output data samples corresponding to the output data signal to one of the array of processing elements, and
the one of the array of processing elements is configured to adapt the DPD parameters by computing modified DPD parameters using the set of output data samples.

6. The SoC of claim 5, wherein:
the hardware accelerator comprises a set of lookup tables (LUTs), each one of the set of LUTs containing two different sets of data entries,
a first one of the two different sets of data entries corresponds to the DPD parameters, and
a second one of the two different sets of data entries corresponds to the modified DPD parameters.

7. The SoC of claim 6, wherein the hardware accelerator is configured to compute the DPD parameters or the modified DPD parameters by correlating the array of data samples transferred via the data interface to one of the first or the second one of the two different sets of data entries, respectively, in response to a control signal received via the data interface.

8. The SoC of claim 1, wherein the hardware accelerator comprises a set of lookup tables (LUTs), each one of the set of LUTs containing data entries corresponding to the DPD parameters, and
wherein the hardware accelerator is configured to compute the DPD parameters in accordance with the predetermined preprocessing function by correlating the array of data samples transferred via the data interface to the data entries in the set of LUTs.

9. The SoC of claim 1, wherein:
the data interface is configured to transfer a set of DPD parameter data samples corresponding to the DPD parameters computed via the hardware accelerator to one of the array of processing elements, and
the one of the array of processing elements is configured to generate the set of preprocessed data samples by computing a first set of modified DPD parameters using the DPD parameters, and applying the first set of modified DPD parameters to the array of data samples corresponding to the input data signal.

10. The SoC of claim 9, wherein:
the data interface is configured to transfer a set of output data samples corresponding to the output data signal to one of the array of processing elements, and the one of the array of processing elements is configured to adapt the first set of modified DPD parameters by computing a second set of modified DPD parameters using the set of output data samples.

11. The SoC of claim 10, wherein:
the hardware accelerator comprises a set of lookup tables (LUTs), each one of the set of LUTs containing two different sets of data entries,
a first one of the two different sets of data entries corresponds to the first set of modified DPD parameters, and
a second one of the two different sets of data entries corresponds to the second set of modified DPD parameters.

12. The SoC of claim 11, wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

13. A wireless device, comprising:
an array of processing elements, each one of the processing elements being configured to perform processing operations on an array of data samples corresponding to an input data signal;
a hardware accelerator; and
a data interface coupled to the array of processing elements and to the hardware accelerator, the data interface being configured to transfer the array of data samples from the array of processing elements to the hardware accelerator,
wherein the hardware accelerator is configured to compute digital pre-distortion (DPD) parameters in accordance with a predetermined preprocessing function using the array of data samples transferred via the data interface; and
a power amplifier (PA) configured to transmit an output data signal based upon a set of preprocessed data samples that are generated using the DPD parameters.

14. The wireless device of claim 13, wherein:
one of the array of processing elements is configured to compute additional DPD parameters, and
the data interface is configured to synchronize the additional DPD parameters computed via the one of the array of processing elements with the DPD parameters computed via the hardware accelerator.

15. The wireless device of claim 14, wherein the hardware accelerator comprises summation circuitry configured to add the DPD parameters and the additional DPD parameters to provide a set of combined DPD parameters.

16. The wireless device of claim 15, wherein the set of preprocessed data samples are generated by applying the set of combined DPD parameters to the array of data samples corresponding to the input data signal.

17. The wireless device of claim 14, wherein:
the data interface is configured to transfer a set of output data samples corresponding to the output data signal to one of the array of processing elements, and
the one of the array of processing elements is configured to adapt the DPD parameters by computing modified DPD parameters using the set of output data samples.

18. The wireless device of claim 17, wherein:
the hardware accelerator comprises a set of lookup tables (LUTs), each one of the set of LUTs containing two different sets of data entries,
a first one of the two different sets of data entries corresponds to the DPD parameters, and
a second one of the two different sets of data entries corresponds to the modified DPD parameters.

19. The wireless device of claim 18, wherein the hardware accelerator is configured to compute the DPD parameters or the modified DPD parameters by correlating the array of data samples transferred via the data interface to one of the first or the second one of the two different sets of data entries, respectively, in response to a control signal received via the data interface.

20. The wireless device of claim 13, wherein the hardware accelerator comprises a set of lookup tables (LUTs), each one of the set of LUTs containing data entries corresponding to the DPD parameters, and
wherein the hardware accelerator is configured to compute the DPD parameters in accordance with the predetermined preprocessing function by correlating the array of data samples transferred via the data interface to the data entries in the set of LUTs.

21. The wireless device of claim 13, wherein:
the data interface is configured to transfer a set of DPD parameter data samples corresponding to the DPD parameters computed via the hardware accelerator to one of the array of processing elements, and
the one of the array of processing elements is configured to generate the set of preprocessed data samples by computing a first set of modified DPD parameters using the DPD parameters, and applying the first set of modified DPD parameters to the array of data samples corresponding to the input data signal.

22. The wireless device of claim 21, wherein:
the data interface is configured to transfer a set of output data samples corresponding to the output data signal to one of the array of processing elements, and
the one of the array of processing elements is configured to adapt the first set of modified DPD parameters by computing a second set of modified DPD parameters using the set of output data samples.

23. The wireless device of claim 22, wherein:
the hardware accelerator comprises a set of lookup tables (LUTs), each one of the set of LUTs containing two different sets of data entries,
a first one of the two different sets of data entries corresponds to the first set of modified DPD parameters, and
a second one of the two different sets of data entries corresponds to the second set of modified DPD parameters.

24. The wireless device of claim 23, wherein the hardware accelerator is configured to compute the first set of modified DPD parameters or the second set of modified DPD parameters by correlating the array of data samples transferred via the data interface to one of the first or the second one of the two different sets of data entries, respectively, in response to a control signal received via the data interface.

* * * * *